(12) United States Patent
Balasubramanian et al.

(10) Patent No.: US 9,271,375 B2
(45) Date of Patent: Feb. 23, 2016

(54) SYSTEM AND METHOD FOR OCCUPANCY SENSING WITH ENHANCED FUNCTIONALITY

(71) Applicant: Leviton Manufacturing Company, Inc., Melville, NY (US)

(72) Inventors: Jaiganesh Balasubramanian, Beaverton, OR (US); Justin Morton, Portland, OR (US); Subramanian Muthu, Portland, OR (US)

(73) Assignee: LEVITON MANUFACTURING COMPANY, INC., Melville, NY (US)

( * ) Notice: Subject to any disclaimer, the term of this patent is extended or adjusted under 35 U.S.C. 154(b) by 79 days.

(21) Appl. No.: 13/775,534

(22) Filed: Feb. 25, 2013

(65) Prior Publication Data
US 2014/0239817 A1 Aug. 28, 2014

(51) Int. Cl.
*H05B 37/02* (2006.01)
(52) U.S. Cl.
CPC ............ *H05B 37/0218* (2013.01); *H05B 37/02* (2013.01); *H05B 37/0227* (2013.01); *H05B 37/0272* (2013.01)
(58) Field of Classification Search
CPC ....................................................... H05B 37/02
USPC .......... 315/149, 152, 155, 291, 312; 340/910, 340/917
See application file for complete search history.

(56) References Cited

U.S. PATENT DOCUMENTS

| 5,397,963 | A | 3/1995 | Manson |
| 5,734,230 | A | 3/1998 | Edwards |
| 5,943,633 | A | 8/1999 | Wilson et al. |
| 6,340,864 | B1 | 1/2002 | Wacyk |
| 7,327,101 | B1 | 2/2008 | Chen et al. |
| 7,342,764 | B2 | 3/2008 | Black |
| 7,528,557 | B2 | 5/2009 | Yang |

(Continued)

FOREIGN PATENT DOCUMENTS

WO 2010027401 A1 3/2010

OTHER PUBLICATIONS

Wallstopper, "LMCT-100 Digital Configuration Tool User Guide," Nov. 2012, (100 pages) http://www.wattstopper.com/products/digital-lighting-management/configuration-tools/lmct-100.aspx#.UW7HCcpqnYY.

(Continued)

*Primary Examiner* — Tung X Le
(74) *Attorney, Agent, or Firm* — Kacvinsky Daisak Bluni PLLC

(57) ABSTRACT

A system and method are disclosed for providing fail-safe operation of a lighting system. A lighting level detector is used to obtain a baseline lighting level for a low-intensity light. If the detector measures less than the baseline level when an occupancy sensor determines the space is unoccupied, a high-intensity light is energized and an indication is provided to a user that the low-intensity light has failed. A method is also disclosed for daylighting operation of a lighting system. An occupancy sensor can have Wi-Fi functionality to enable remote configuration of the sensor. A line voltage occupancy sensor can include an interface with low voltage devices. An occupancy sensor can include an integral interface to enable an external control system to override the sensor's normal logic under emergency conditions. An occupancy sensor can include an active temperature compensation feature. An occupancy sensor can also incorporate an automatically adjustable coverage area.

40 Claims, 19 Drawing Sheets

(56) References Cited

U.S. PATENT DOCUMENTS

| | | | |
|---|---|---|---|
| 7,608,807 | B2 | 10/2009 | Hick et al. |
| 8,228,163 | B2 | 7/2012 | Cash et al. |
| 8,304,936 | B2 | 11/2012 | Wiener |
| 8,445,826 | B2 | 5/2013 | Verfuerth |
| 2006/0085099 | A1 | 4/2006 | Burlak et al. |
| 2007/0176566 | A1 | 8/2007 | Fukumoto |
| 2007/0273307 | A1 | 11/2007 | Westrick et al. |
| 2008/0079569 | A1 | 4/2008 | Axelsen |
| 2008/0100140 | A1 | 5/2008 | Sorenson et al. |
| 2009/0278479 | A1 | 11/2009 | Platner et al. |
| 2010/0294915 | A1 | 11/2010 | Williams et al. |
| 2011/0058296 | A1 | 3/2011 | Orchowski |
| 2011/0140612 | A1 | 6/2011 | Mohan et al. |
| 2011/0260854 | A1 | 10/2011 | Aikens et al. |
| 2012/0007511 | A1 | 1/2012 | Choong et al. |
| 2012/0013257 | A1* | 1/2012 | Sibert ............... H05B 37/0245 315/152 |
| 2012/0025717 | A1 | 2/2012 | Klusmann et al. |
| 2012/0038490 | A1* | 2/2012 | Verfuerth ..................... 340/910 |
| 2012/0136485 | A1 | 5/2012 | Weber et al. |
| 2012/0161645 | A1 | 6/2012 | Dingemans et al. |
| 2012/0170513 | A1* | 7/2012 | Vogedes et al. ............... 370/328 |
| 2012/0299728 | A1 | 11/2012 | Kirkpatrick et al. |
| 2012/0330476 | A1 | 12/2012 | Huizenga et al. |
| 2013/0010018 | A1 | 1/2013 | Economy |
| 2013/0026947 | A1 | 1/2013 | Economy et al. |
| 2013/0030589 | A1 | 1/2013 | Pessina et al. |
| 2013/0065642 | A1 | 3/2013 | Liu |
| 2013/0171981 | A1 | 7/2013 | Woo |
| 2014/0001977 | A1* | 1/2014 | Zacharchuk et al. ......... 315/291 |
| 2014/0062297 | A1* | 3/2014 | Bora et al. ..................... 315/34 |

OTHER PUBLICATIONS

Lutron, "EcoSystrem Programmer", Aug. 26, 2010 (1 page). www.lutron.com/TechnicalDocumentLibrary/369321a%20ecosystem%20programmer.pdf.

Lutron, "EcoSystem Programmer Programming Guide," (44 pages) www.lutron.com/TechnicalDocumentLibrary/032170a.pdf.

SensorSwitch, "nPP16 WiFi," (2 pages) http://www.sensorswitch.com/OnlineCatalog.aspx?sn=nPP16%20WIFI.

Leviton Mfg. Co., Inc. Lighting Management Systems, "OSFHU Lens Selection," Technical Article ID: 091708-tl-01, Sep. 17, 2008 (1 page).

Leviton Manufacturing Co., Inc., "Leviton Adds Increased Functionality to OSFHU High-Bay Occupancy Sensor," 2008 (1 page).

Leviton Manufacturing Co., Inc., "Remote Network miniZ Intelligent Daylight Management System," Product Specification, May 23, 2010 (2 pages).

The Wall Stopper, "HPCSIN Indoor Photocell Sensor Installation and Setup," Installation Instructions, 2001 (2 pages).

Maxim Integrated Products, "uP Supervisory Circuits with Windowed (Min/Max) Watchdog and Manual Reset," Product Specification, Dec. 2005 (12 pages).

The Wall Stopper, "HPCSKY Skylight Photocell Sensor Installation and Setup," Installation Instructions, 2001 (2 pages).

The Wall Stopper, "HPCSOT Outdoor Photocell Sensor Installation and Setup," Installation Instructions, 2001 (2 pages).

The Wall Stopper, "HPCU Photocell Controller Unit Installation and Setup," Installation Instructions, 2001 (4 pages).

The Wall Stopper, "Daylight Control—Design and Application Guide," Jul. 2007, (20 pages).

Architectural Energy Corporation, "Pier Lighting Research Program—State of the Art Photocell Final Report," Feb. 26, 2003 (23 pages).

Precision Multiple Controls, Inc., "State-of-the-Art Electronic Photocontrols," May 23, 2010 (4 pages).

Leviton Lighting Management Systems, MiniZ User's Guide—Daylight Harvesting Made Simple, Apr. 2007 (26 pages).

Leviton Manufacturing Co., Inc., Lighting Management Systems Division, "Z-Max Quick Programming Guide," May 23, 2010 (37 pages).

Douglas Lighting Controls, "W-2000 Lighting Control Networks—Constant Light Control, Daylight Harvesting," May 23, 2010 (4 pages).

Leviton, Photocell Installation Instructions, May 23, 2010 (2 pages).

Leviton Mfg. Co., Inc. Lighting Management Systems, "Dual Relay Multi-Technology Wall Switch Occupancy Sensors," Product Data, 2008 (6 pages).

Health Co. LLC, "Motion Sensor Light Control," 2007 (4 pages).

Leviton Mfg. Co., Inc. Lighting Management Systems, "Photocells—Measures Light Levels to Automatically Adjust Light Levels to a User-Defined Level," 2009 (4 pages).

Opto Semiconductors, OSRAM, "High Accuracy Ambient Light Sensor," SFH 5711, Apr. 3, 2007 (9 pages).

Leviton Mfg. Co., Inc. Lighting Management Systems, "OSFHU Fixture-Mounted Infrared High-Bay Occupancy Sensor," 2009 (2 pages).

Intermatic, "Photo Controls," 2003 (4 pages).

Douglas, "Daylight Sensor—On/Off Control," Technical Data WPC-5621K, May 23, 2010 (2 pages).

Precision Multiple Controls, Inc., "Specification for Model ESC-124DS, Photocell/Timer," May 23, 2010 (2 pages).

Leviton, "High Bay/Low Bay Passive Infrared Occupancy Sensor and Offset Adapter," Installation Instructions, May 23, 2010 (2 pages).

International Search Report and Written Opinion for PCT/US2011/037559, dated Feb. 9, 2012 (10 pages).

Wallstopper, "LMCT-100 Digital Wireless Configuration Tool," Nov. 2012, (2 pages) http://www.wattstopper.com/products/digital-lighting-management/configuration-tools/lmct-100.aspx#.UW7HCcpqnYY.

International Search Report and Written Opinion issued in corresponding PCT/US2014/015277, filed Feb. 7, 2014, mailed Nov. 20, 2014 (14 pages).

* cited by examiner

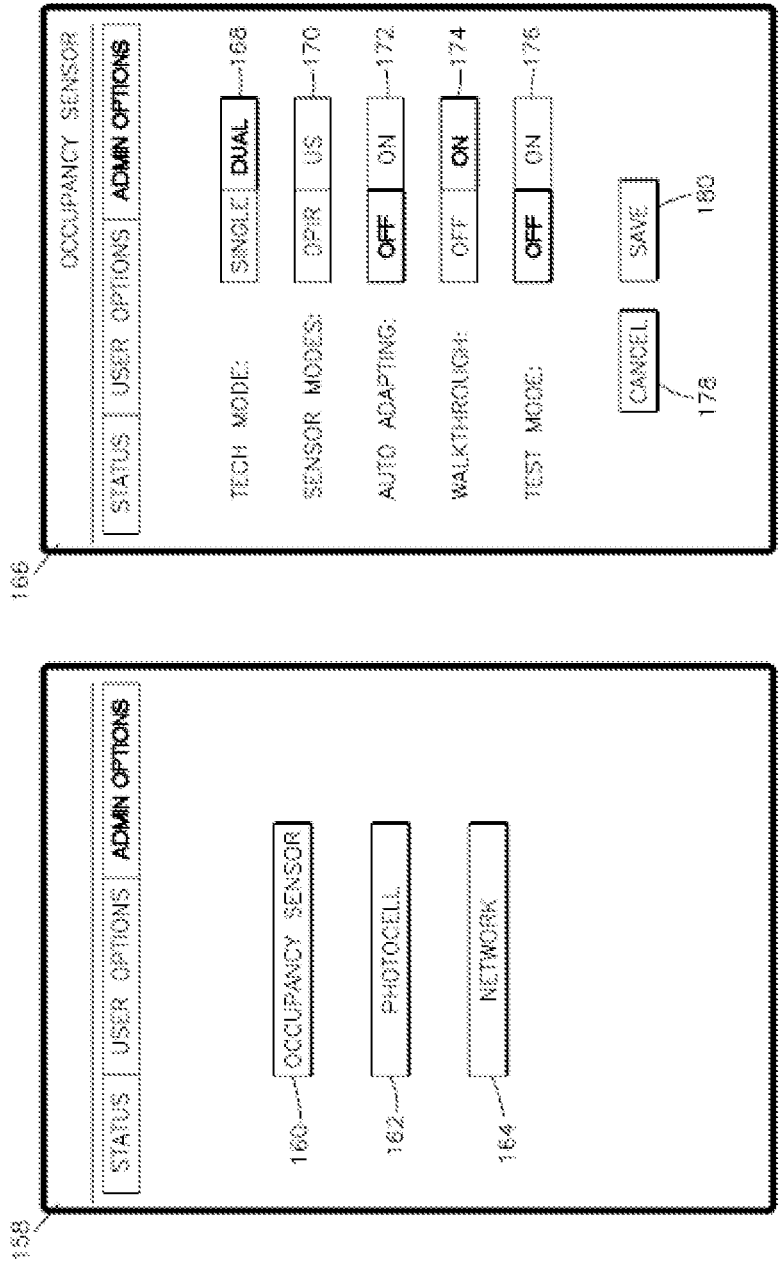

SYSTEM AND METHOD FOR OCCUPANCY SENSING WITH ENHANCED FUNCTIONALITY

FIELD OF THE DISCLOSURE

The present disclosure relates generally to occupancy sensing systems, and more particularly to an improved system and method for occupancy sensing systems having enhanced functionality.

BACKGROUND OF THE DISCLOSURE

Occupancy sensors are designed to save energy by detecting the presence of a moving object in an area of coverage and switching a light source on and off depending upon the presence of the moving object. For example, when motion is detected within the area of coverage, the light source is turned on. Alternatively, when motion is not detected indicating that the area of coverage is not occupied, the light source is turned off after a predetermined period of time. Occupancy sensors thus facilitate electrical energy savings by automating the functions of a light switch or an electrical outlet.

Occupancy sensors can be used to monitor any of a variety of locations, including office spaces, hotel rooms, stairwells, and the like. Where occupancy sensors are used to control lighting in spaces such as stairwells or other areas where visibility is important, occupancy sensor failure can present a safety hazard because lighting may remain off even when a person has entered the area. To address such potential safety hazards, the National Fire Protection Association (NFPA) 101 Life Safety Code requires that low level ambient lighting be provided in stairwells and other areas where visibility is important even when they are not occupied. Thus, one high-intensity light may provide normal space illumination when motion is detected, while a second, low-intensity, light may provide the low level ambient lighting when motion is not detected. Such arrangements provide energy savings, along with desired safety, because the high-intensity light is illuminated only when the space is occupied, while the low-intensity light provides desired safety illumination levels when the space is not occupied.

A disadvantage of using a high-intensity light and a low-intensity light configuration is the potential for the low-intensity ambient light failing, and subsequently the occupancy sensor malfunctioning so that the high-intensity light does not turn on when the space is occupied. Furthermore, a high-intensity light and a low-intensity light configuration does not provide a way to determine if the low-intensity light has failed other than if a person enters the space and visually determines that both the high-intensity light and the low-intensity light have not turned on. Thus, as will be appreciated, a high-intensity light and a low-intensity configuration would provide a "safe" configuration only if the low-intensity light is functioning properly.

It would, therefore, be desirable to provide a fail-safe arrangement for an occupancy sensor that ensures that a space is illuminated even in the event that the low-intensity light fails. It would also be desirable to provide an arrangement in which failed low-intensity lighting can be automatically identified so that repair can be scheduled in an efficient manner.

It would further be desirable to provide an occupancy sensor having a variety of advanced functionality. For example, current occupancy sensors include configuration features that can only be accessed by a user having direct physical access to the sensor. For sensors positioned in elevated locations this is inconvenient and can pose a safety hazard as it requires the user to be on a ladder. It would therefore be desirable to provide an occupancy sensor that is remotely configurable so that a user standing on the ground can remotely configure one or more occupancy sensors positioned on a ceiling, high wall, or the like.

In addition, current applications that employ multiple occupancy sensors (e.g., large halls, multiple entrance rooms, or stairways), do so using a plurality of low voltage occupancy sensors. Low voltage occupancy sensors are sensors without a relay, and as such they cannot directly control a connected load. Rather, they must be connected to a separate load control device such as a power pack, which switches the load on/off in response to a signal from the occupancy sensors. It would be desirable to provide a line voltage occupancy sensor with a built-in load control feature as well as interfaces to a plurality of low voltage occupancy sensors so that the line voltage sensor can act as a load control device for the low voltage sensors.

Moreover, current occupancy sensors are often coupled to building automation systems or building management systems (BMS). Under emergency conditions (e.g., fire), the BMS acts to override the normal operation of the occupancy sensors to ensure that the lights stay on to aid emergency personnel, such as firemen as well as security personnel. Coupling of the occupancy sensors to the BMS is often accomplished through external interface units. As will be appreciated, providing separate external interface units can result in increased system cost. It would be desirable, therefore, to provide an occupancy sensor with an integral interface for connecting to a BMS to enable the BMS to override the normal operation of the sensor under emergency conditions.

In addition, passive infrared (PIR) occupancy sensors operate by sensing a body having a heat signature in excess of background infrared (IR) levels. As the ambient temperature of a monitored space rises, the difference between human body temperature and the ambient temperature decreases, and as a result PIR occupancy sensors can be less able to differentiate the heat of a human body from the heat of the surroundings. This may be particularly acute where the occupancy sensor is deployed in a hot climate where the temperature of the monitored space can be very high if air conditioning is not in use. It would be desirable to provide an occupancy sensor with an active temperature compensation feature to ensure that passive infrared (PIR) sensors appropriately indicate an occupancy condition even at high ambient temperatures. In addition, it would be desirable to provide an occupancy sensor with an automatically adjustable coverage area, so as to eliminate the need for masking inserts.

SUMMARY OF THE DISCLOSURE

A load control system is disclosed, comprising an occupancy sensor for sensing an occupancy condition of a monitored area. The load control system may also include a light sensor for providing a lighting signal representative of a lighting level of the monitored area. Regardless of the occupancy condition of the monitored area, an associated load may be energized when the lighting signal indicates the lighting level is below a predetermined threshold lighting level.

A method is disclosed for controlling an electrical load. The method may include receiving, at a load control device, a lighting signal representative of a lighting level of a monitored area; and energizing an electrical load when the lighting signal indicates the lighting level is below a predetermined threshold lighting level and an occupancy sensor associated with the monitored area indicates the monitored area is vacant.

A method is disclosed for controlling an electrical load. The method may include, at a light sensor, detecting an ambient light level in a monitored space, and, when the controlled electrical load is not energized, controlling the electrical load in response to an amount of light in the space as measured by the light sensor.

The method may further comprise, at an occupancy sensor, detecting an occupancy condition of the monitored space, and controlling the electrical load in response to the as-measured amount of light in the space and the occupancy condition of the monitored space. The method may also include controlling the electrical load to be in a dimmed or de-energized state when the measured amount of light in the space exceeds a predetermined level. In some embodiments, controlling the electrical load to be in a dimmed or de-energized state may occur regardless of the occupancy condition of the monitored space.

The light sensor and the occupancy sensor may be integrated in a single housing coupled to a processor. Alternatively, the light sensor and the occupancy sensor may be provided in separate housings. The method may further include compensating for an amount of light contributed by the electrical load in determining the amount of light in the space as measured by the light sensor. In some embodiments, compensating may comprise performing a calibration when a manual set point of the light sensor is being programmed. In other embodiments, calibration may include switching the electrical load on and off a plurality of times to measure an amount of light level change that occurs. The method may further include adjusting a hysteresis value to be an amount greater than the light level change. In some embodiments the hysteresis value may be twice the amount of the light level change. In other embodiments, the hysteresis value may be stored non-volatile memory.

An occupancy sensor is disclosed, comprising an occupancy sensing element, and a wireless transceiver for receiving wireless signals from a remote device to configure the occupancy sensor from a remote location. The wireless transceiver may be further configured to transmit wireless signals to the remote device, where the transmitted wireless signals including information representative of an operational characteristic of the wireless occupancy sensor during a previous time period.

A method is disclosed for controlling a load with a wireless occupancy sensor. The method may include receiving, at a wireless occupancy sensor, wireless signals from a remote device, where the wireless signals configure the occupancy sensor. The method may further include transmitting, from the wireless occupancy sensor, wireless signals to the remote device. The transmitted wireless signals may include information representative of an operational characteristic of said wireless occupancy sensor during a previous time period.

BRIEF DESCRIPTION OF THE DRAWINGS

By way of example, a specific embodiment of the disclosed device will now be described, with reference to the accompanying drawings, in which:

FIGS. 6A-6D are a series of screen shots from an exemplary remote device illustrating steps for configuring a wireless occupancy sensor according to a further embodiment;

DETAILED DESCRIPTION

A system and method are disclosed for providing fail-safe operation of a lighting system so that primary lighting associated with an occupancy sensor will be energized in the event that a low level ambient "safety" light malfunctions. As will be appreciated, this functionality may be desirable for applications in which lighting systems may impact public safety. Examples of such applications may include, but are not limited to, lighting in public staircases, parking lots, parking ramps, or other areas where public safety may be compromised if a low level ambient "safety" lighting fails to energize, etc. The disclosed system and method may find application with a variety of different types of occupancy sensing technologies, load control devices, and loads.

Figure 1:
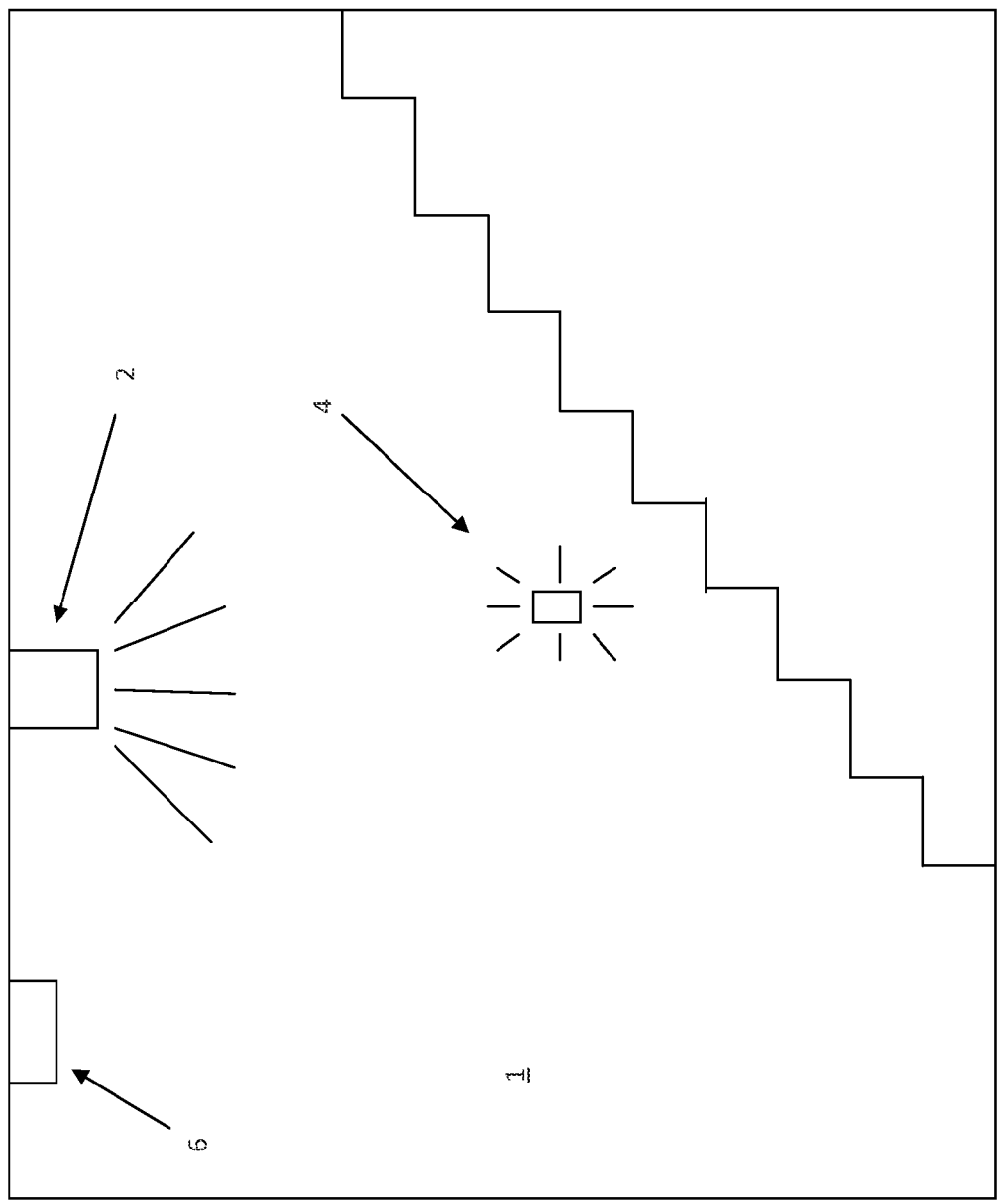
FIG. 1 is a schematic diagram of an embodiment of the disclosed system.

Certain governmental life safety organizations have standards that require low level ambient lighting in stairwells and/or other public areas even when the stairwells are not occupied. For example, the National Fire Protection Association (NFPA) 101 Life Safety Code requires low level ambient lighting (e.g., 1 foot-candle (fc) of illumination) to be provided in stairwells even when the stairwells are not occupied. This compares to the at least 10 fc of illumination required by NFPA 101, the Life Safety Code, when stairways are occupied (see NFPA 101, Section 7.8.1.3) Thus, as shown in FIG. 1, a space 1, such as but not limited to a stairwell, preferably includes two different types of lighting loads. The first light 2 may be a high-intensity light configured to provide a level of lighting normally associated with an occupied space. The second light 4 may be a relatively low-intensity "safety" light configured to provide a minimal amount of light required to enable a person to safely navigate the space 1 should the first light 2 fail, or should an associated occupancy sensor fail to signal the first light 2 to energize.

It is generally desirable to turn off the first light 2 when the space 1 is unoccupied in order to conserve energy. As such, the second light 4 is used as a safety precaution to provide a small amount of light when the space is vacant in the event that the occupancy system fails to turn on the first light 2 after a person enters the space. If, however, the second light 4 fails (e.g., burns out), this safety feature is defeated. The failure of the second light 4 may go undiscovered because, by design, the second light 4 may be configured to turn on only when the space is vacant. The disclosed system is configured to automatically detect a failure in the second light 4 so that the first light 2 can be immediately energized, regardless of whether the space 1 is occupied. Thus, the space 1 will never be completely dark. In one embodiment, the occupancy sensor 6 is configured to sense failure of the second light 4. The occupancy sensor 6 may transmit a signal to the first light 2 to energize regardless of occupancy in the space 1 in order to maintain safe conditions in the space.

Although the illustrated embodiment shows that the space 1 is serviced by one first light 2 and one second light 4, it will be appreciated by those of ordinary skill in the art that additional first and/or second lights may be provided. In addition, multiple occupancy sensors 6 can also be provided to sense occupancy in the space 1.

In one embodiment, the occupancy sensor 6 automatically detects when the second light 4 has failed, and in turn transmits a signal to the first light 2 to energize even when the space 1 is vacant. In addition, upon detecting that the second light 4 has failed, the occupancy sensor 6 may transmit an alarm signal to alert operational personnel (e.g., building management) of the failure so that corrective actions can be taken in a timely manner.

Figure 2:
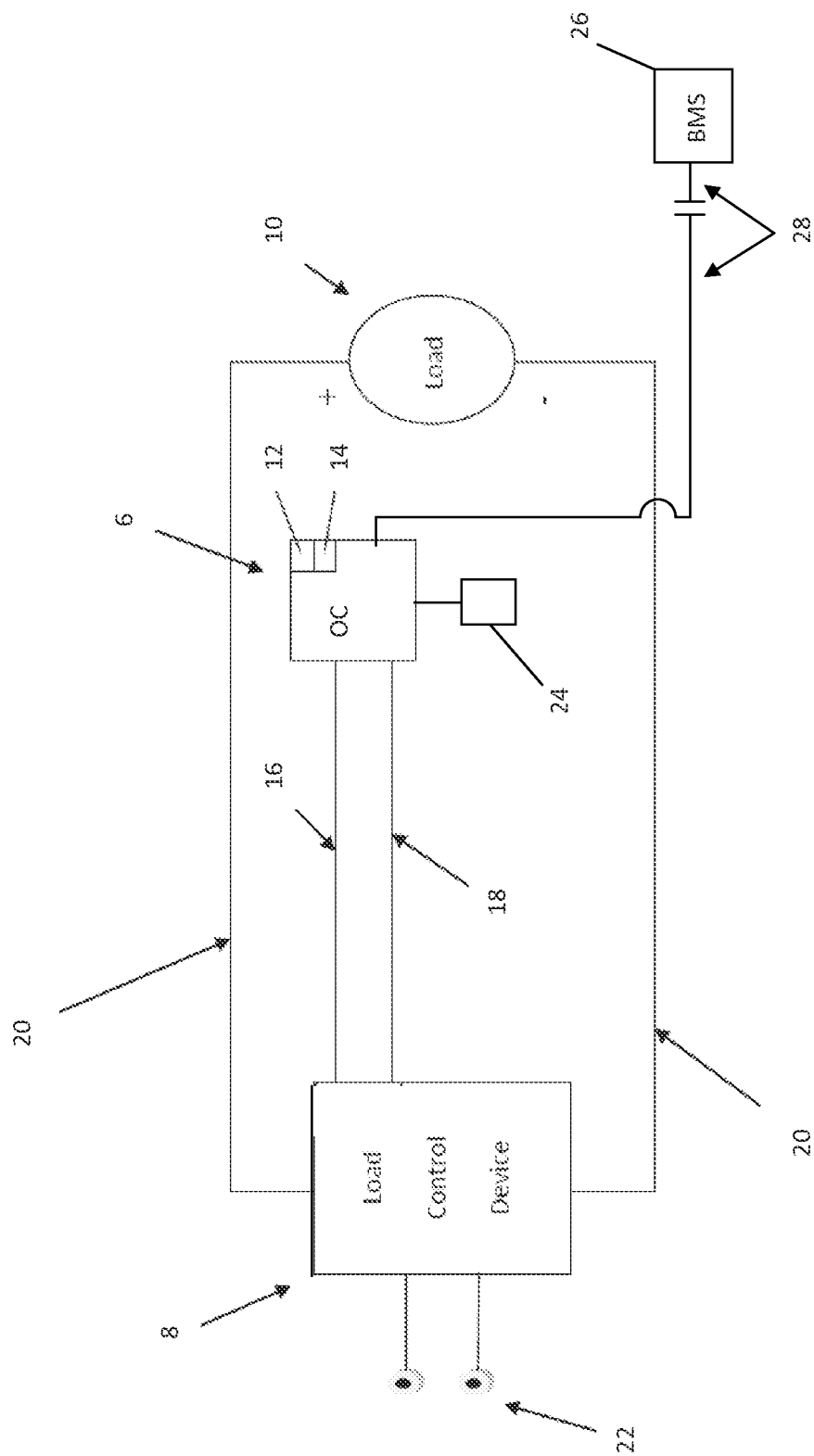
FIG. 2 is a schematic diagram of an exemplary occupancy sensing system according to an embodiment of the disclosure.

FIG. 2 shows an embodiment of the occupancy sensor 6 coupled to a load control device 8 and a load 10. The occupancy sensor 6 may include a processor 12 configured to control one or more operational aspects of the occupancy sensor. The processor 12 may also be configured to control and decode communication signals sent between the occupancy sensor 6 and the load control device 8 via signal line 18. The memory 14 may be associated with the processor 12 for storing operational and configuration information relating to the occupancy sensor 6 and/or other elements of the system. The memory 14 may be any of a variety of volatile or non-volatile memory devices now or hereinafter known by those of ordinary skill in the art.

The occupancy sensor 6 may receive power from the load control device 8 via the power line 16, and may transmit signals (e.g., occupancy signals) to the load control device 8 via signal line 18. In response to signals received from the occupancy sensor 6, the load control device 8 may energize the load 10 via one or more power lines 20. In one embodiment, the load 10 may include at least one light. The load control device 8 may receive line power from a building power source 22. Alternatively, the load control device 8 may be powered by an internal battery (not shown).

When the load control device 8 receives an occupancy signal from the occupancy sensor 6, it may control operation of the associated load 10 accordingly. For example, when the occupancy signal 6 transmits a signal to the load control device 8 communicating that the space is occupied, the load control device 8 may energize the load 10 by providing power via the power line 20.

Although the illustrated embodiments include a single occupancy sensor 6, a single load control device 8, and a single load 10, it will be appreciated by those of ordinary skill in the art that any number of sensors, loads and/or load control devices may be used in combination to provide an occupancy sensing system having a desired functionality and coverage. For example, it will be appreciated that a space, such as but not limited to a public parking garage, may have multiple stairwells that may be monitored by multiple occupancy sensors. In addition, one or more loads may be associated with each occupancy sensor. Alternatively, one or more occupancy sensors may be associated with each load. Further combinations of components are contemplated, as will be appreciated by one of ordinary skill in the art.

In addition, although the occupancy sensor 6 and the load control device 8 are illustrated as being separate components, in some embodiments the occupancy sensor 6 may include internal load control functionality, eliminating the need for a separate load control device 8.

The occupancy sensor 6 may be in communication with an ambient light detector 24, such as but not limited to, a photocell. Although the ambient light detector 24 is shown as being external to the occupancy sensor 6, it may also be an integral part of the sensor 6. The ambient light detector 24 may be operable to sense an ambient lighting level in the monitored space and to provide associated light level information to the processor 12. Based on the ambient lighting level information provided by the ambient light detector 24, the processor 12 may adjust or override the normal logic of the occupancy sensor 6. In some embodiments the photocell can have its own controller that can communicate with the occupancy sensor and/or the load control device.

In one embodiment, ambient lighting levels are stored in the memory 14, and the processor 12 compares the light level information provided by the ambient light detector 24 to determine if the measured ambient light level in the monitored space is at or above a predetermined level. If the measured ambient light level is equal to or exceeds the predetermined level, then it may be assumed that the second light 4 (see FIG. 1) is functional, and the normal logic of the occupancy sensor 6 may prevail (i.e., the first light 2 is turned on if an occupancy condition is sensed, and the first light 2 is allowed to turn off after a predetermined delay period of no occupancy). If, however, the measured ambient light level is below the predetermined level, it may be assumed that the second light 4 has failed, and the normal logic of the occupancy sensor 6 may be overridden so that the first light 2 is automatically and immediately energized to provide a safe lighting condition in the monitored space. In this condition, the first light 2 may remain energized regardless of whether the occupancy sensor 6 determines that the space is occupied. In addition, normal timeouts for the first light 4 may be overridden so that a constant ON condition exists for the first light 2.

In some embodiments the system can be calibrated to "teach" the processor how much light should be expected when only the second light 4 is on for a particular installation. Such calibration can be performed in a manual or automatic fashion.

In some embodiments, the occupancy sensor processor 12 may be connected to a building automation system or building management system (BMS) 26 via a hard wired or wireless communication link 28. The processor 12 may transmit a signal to the BMS 26 if the measured ambient light level is determined to be below the predetermined level. This, in turn, may signal an alarm that alerts building management personnel that the second light 4 associated with the monitored space has failed, and that corrective action is necessary. In one embodiment, the processor 12 sends a periodic signal to the BMS 26 until the occupancy sensor 6 is reset, either via a manual reset at the occupancy sensor 6 (e.g., button, toggle, etc.) or via a reset signal transmitted from the BMS to the processor 12. Alternatively, the occupancy sensor 6 may be automatically reset upon replacement of the second light 4. Furthermore, the occupancy sensor 6 may be automatically reset by turning the first light 2 off and a determination of a threshold ambient light level detected by the light sensor.

The occupancy sensor 6 may also be provided with a self-test feature wherein the occupancy sensor may periodically turn off the first light 2 in order to detect proper operation of the second light 4 and/or to detect whether a fault has been corrected within a pre-determined time period after a fault has been identified.

In one embodiment, the processor 12 may store measured light level information in the associated memory 14 for future use. For example, measured ambient light levels may be stored over time, and trending information can be generated that may be used to actively predict when a second light 4 may fail. This may also be useful for instances in which multiple second lights 4 are provided for a large space, and where an unsafe condition may not result if only one of the second lights 4 fails. The processor 12 may recognize the reduced ambient lighting level condition and transmit a signal to the BMS that an inspection is warranted.

In some embodiments, when the occupancy sensor 6 identifies a failed second light 4, a visual indicator, such as but not limited to a light emitting diode (LED), may be provided on the occupancy sensor 6 or load control device 8 to indicate failure of the second light 4. This feature may allow for walk-through identification of a lighting failure condition in a particular space. In addition, the occupancy sensor 6 may be coupled to a private or public network to facilitate remote notification when a failure of the second light occurs. In some embodiments, information of a lighting failure condition may be sent via the Internet to a web page to enable remote monitoring of spaces. A building manager or other authorized individual or agency may monitor this information to determine if lighting replacement is required. In some embodiments the remote notification may be sent in an e-mail or a text message to one or more mobile or desktop computers.

The occupancy sensor 6 may include any of a variety of sensor technologies, such as passive infrared sensors (PIR), ultrasonic sensors (US), dual infrared-ultrasonic sensors, and the like.

Any of the above described embodiments may be implemented using a processor associated with the occupancy sensor 6. By implementing the arrangement of the system using software associated with the processor, changes to device wiring may be avoided. Alternatively, the arrangement of the system may be implemented using a combination of hardware and software.

In some embodiments, the disclosed arrangement may be of advantage if the occupancy sensor 6 fails or if the sensing device within the occupancy sensor fails. For embodiments in which the processor 12 is separate from the occupancy sensor 6, the light sensor 24 may detect instances in which the second light 4 has failed, and the processor may then command the first light 2 to be turned on so that the monitored area is illuminated for occupants. For embodiments in which the light sensor 24 is incorporated into the occupancy sensor 6, and the occupancy sensing device fails, the light sensor 24 can still detect the loss of the second light 4 so that the light first light may be turned on.

An advantage of the disclosed arrangement is that it may be implemented without additional hardware. Thus, in some embodiments it may be implemented through a change to the occupancy sensor's operating software. The disclosed system and method may be implemented in any system that uses an occupancy sensor for control.

Although the illustrated occupancy sensor 6 is disclosed as including a discrete controller 12, it will be appreciated by one of ordinary skill that the appropriate logic for implementing the disclosed features of this sensor may also be embodied in appropriate hardwired circuitry associated with the occupancy sensor 6. Thus, the logic associated with this embodiment can be in hardware, software, or a combination of the two. It will further be appreciated that the occupancy sensor 6 may also include any or all of the features of the embodiments described in relation to FIGS. 3-14.

Figure 3:
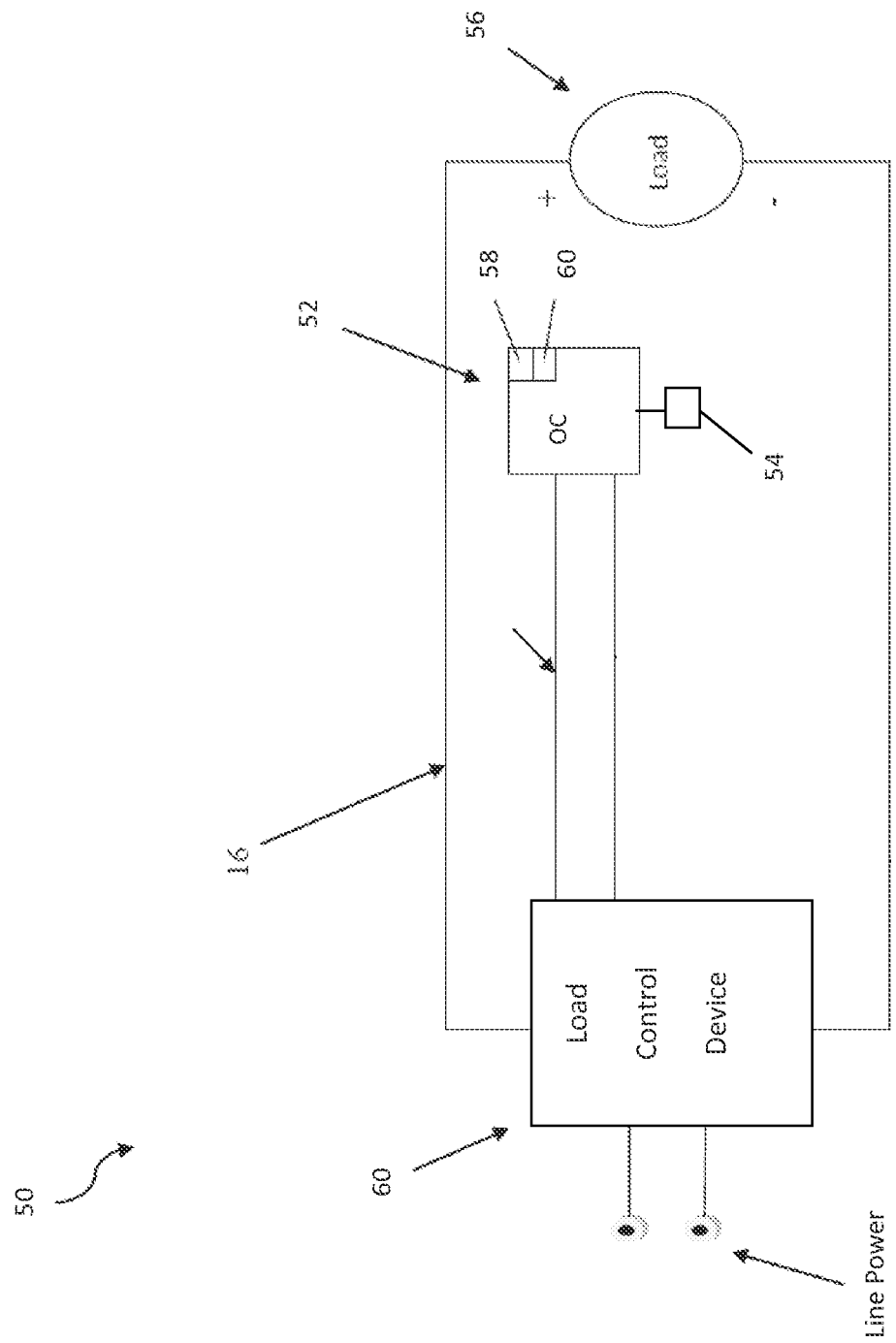
FIG. 3 is a schematic diagram of an exemplary occupancy sensing system according to a further embodiment.

Referring now to FIG. 3, a system 50 is disclosed for implementing a daylighting scheme using an occupancy sensor 52 with a photocell or integrated light sensor 54. The light sensor 54 may detect ambient light levels in the monitored space so that a base level of illumination may be maintained in a space. The occupancy sensor 52 normally is configured to transmit a signal to energize an associated load 56 (e.g., space lighting) when the space is occupied, and to transmit a signal to shut off the load 56 when the space is unoccupied after a pre-determined time. The system 50 may include an automated control that either turns off or dims the load 56 in response to an amount of available daylight in the space, as measured by the light sensor 54. Thus, in some embodiments, the occupancy sensor 52 may include an ambient light hold-off, which allows some or all of the lights in a space to remain off when natural lighting reaches a particular level as measured by the light sensor 54, regardless of occupancy status of the space. The resulting system can be effective at reducing electrical consumption.

It will be appreciated that it is desirable that the ambient light holdoff feature only be tripped when ambient light to the space exceeds a particular threshold level. However, in some cases, the placement of light sensor 54 configured for open-loop operation may still receive light contributions from the load 56. For dimmed daylighting systems, this may not present a problem since the intensity of the load 56 is often changed slowly, in near imperceptible increments. When daylighting is accomplished with switched loads though, there may be obvious changes to the light intensity when the switching occurs. For this reason, load switching may be performed at a time when it is not particularly noticeable and more importantly in a way that keeps the load 56 from switching on and off after short periods of time.

In the disclosed system and method, the occupancy sensor's processor 58 calculates a hysteresis for switching lights on and off when used in open-loop daylighting where light contribution from the load 56 is a factor in the light sensor's measurement. In some embodiments, software timeouts can be used to delay the change in state of the load 56 to keep switching to a minimum when outside (natural) light is fluctuating near the trip point. In addition, a software hysteresis may be employed to further decrease unwanted repetitive state changes.

If the installation of the light sensor 54 used in open-loop daylighting is positioned such that some illumination from the load 56 is contributing to the light sensor's measurement, the hysteresis may not be large enough, which may result in the lights turning on and off at whatever timer delays are in place.

To alleviate this problem without installer intervention, the processor 58 may be programmed to perform a calibration routine whenever the manual set point for the light sensor 54 is being programmed. This calibration routine may include turning the load 56 on and off several times to measure the change in the amount of light that the light sensor 54 measures. This change represents the amount of light that is contributed by the load 56. The hysteresis may be automatically or manually adjusted to be an amount greater than that change in the amount of light.

In one non-limiting example, if the light sensor 54 reads a value of "5" with the load 56 turned ON, and a value of "4.5" with the load 56 turned OFF, the processor 58 may determine that there is a 0.5 value drop when the load 56 is turned off, and a 0.5 value increase when the load 56 is turned on. The hysteresis value would then be some value greater than "0.5". For example, the hysteresis value may be twice the difference between the ON and OFF values. The system set point may then be set appropriately. In one embodiment, this hysteresis value may be stored in non-volatile memory 60 associated with the processor 58.

It will be appreciated that the system described above can be implemented using an occupancy sensor having an integral light sensor, or for a system in which the occupancy sensor and the light sensor are provided as discrete system components. In addition, the light sensor may include its own processor (not shown), in which some or all of the functionality described in relation to the occupancy sensor processor may be embodied in the light sensor processor. Further, such logic and control may be incorporated into a load control device 60 associated with the occupancy sensor and light sensor.

In addition, although the illustrated occupancy sensor 52 includes a discrete processor 58, it will be appreciated that the appropriate logic for implementing the disclosed features of this embodiment may also be incorporated in appropriate hardwired circuitry associated with the occupancy sensor 52, light sensor 54 and/or load control device 60. Thus, the logic associated with this embodiment can be in hardware, software, or a combination of the two. It will further be appreciated that the occupancy sensor 52 may also include any or all of the features of the embodiments described in relation to FIGS. 1, 2 and 4-14.

Figure 4:
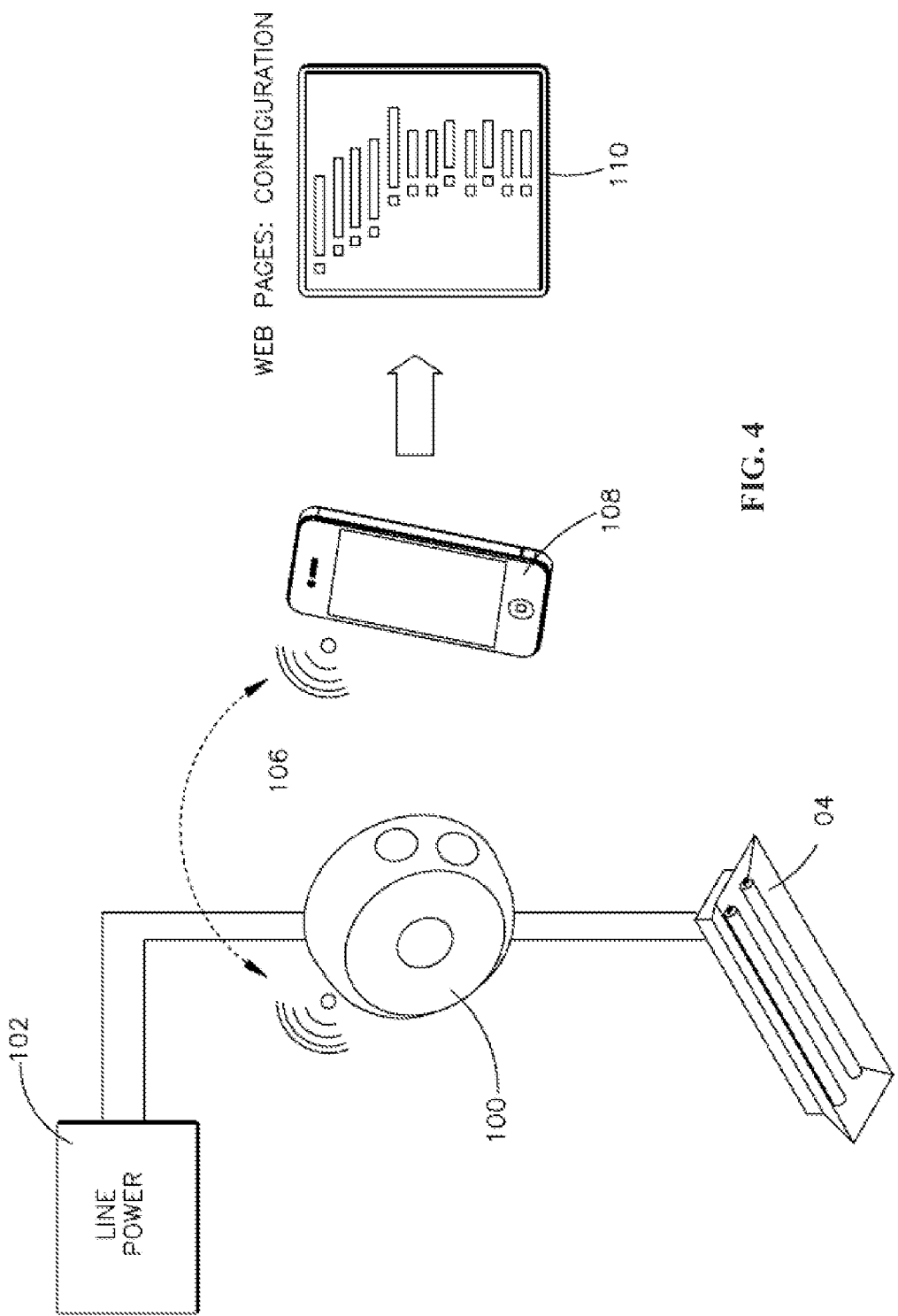
FIG. 4 is a schematic diagram of an occupancy sensing system according to a further embodiment.

FIG. 4 shows a further embodiment of a wireless occupancy sensor 100 that may include wireless technology to enable the sensor to be remotely configured by a user. The disclosed arrangement provides an advantage over current occupancy sensors which require adjustments to be made manually at the device using buttons, dip-switches, etc. It will be appreciated that in applications where the detectors are positioned at elevated locations (ceilings, high wall positions, etc.) the disclosed wireless occupancy sensor 100 eliminates the need for a user to climb a ladder to make adjustments to the detector. In addition, a plurality of wireless occupancy sensors can be quickly configured by a user with an appropriate remote device.

In the illustrated embodiment, the wireless occupancy sensor 100 receives power from a building power source 102 and controls at least one load 104 in response to a sensed occupancy condition in a monitored space. The wireless occupancy sensor 100 may additionally receive wireless signals 106 from a remote device 108 to perform one or more internal configuration functions. For example, a user can employ the remote device 108 to set one or more configuration and/or operational parameters of the occupancy sensor, as will be described in greater detail below. In the illustrated embodiment, the remote device 108 may call a web page 110 that includes an appropriate interface for enabling a user to remotely configure the wireless occupancy sensor 100 in a desired manner.

Figure 5:
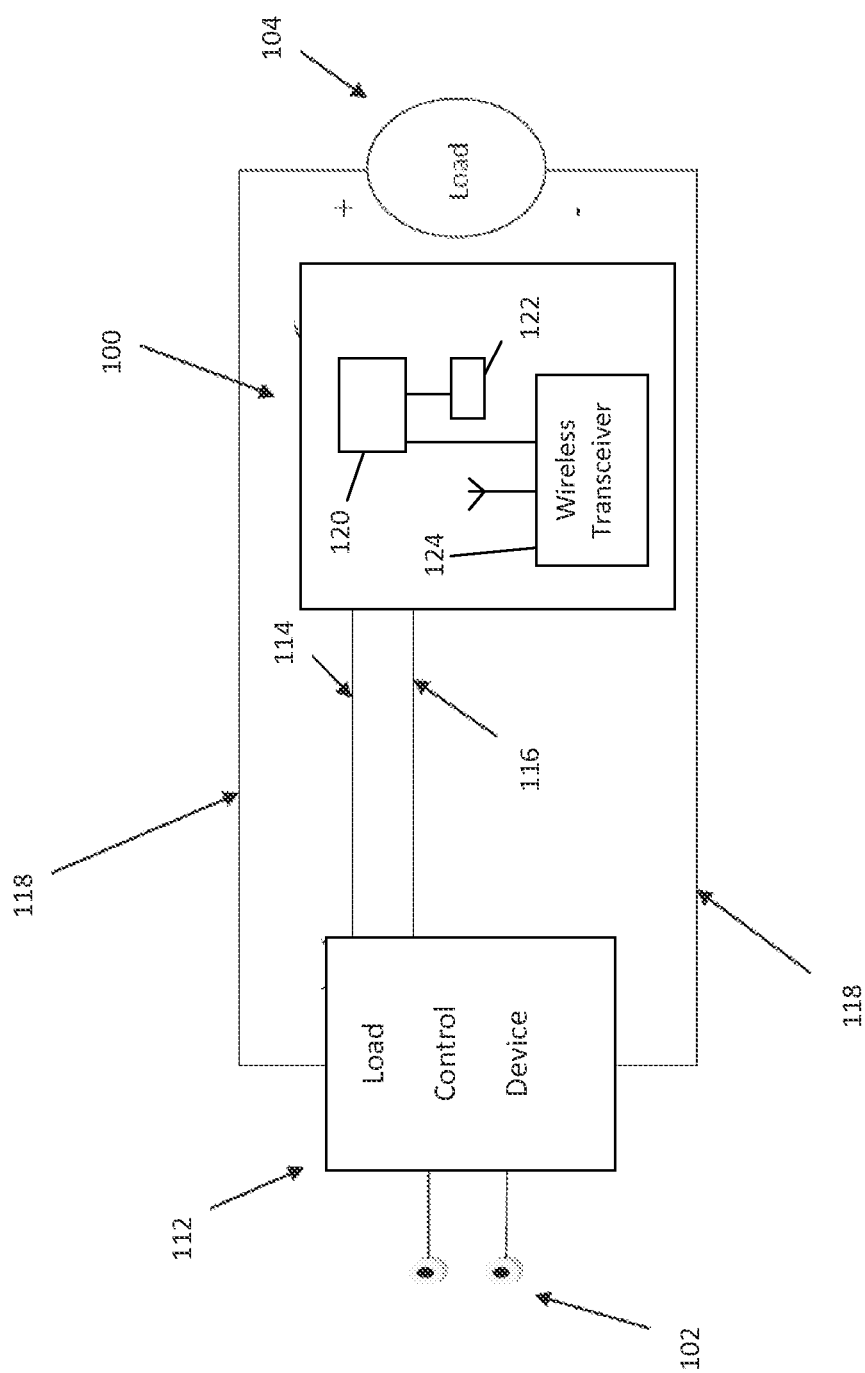
FIG. 5 is a schematic diagram of an embodiment of the disclosed system of FIG. 4.

Referring to FIG. 5, the wireless occupancy sensor 100 may be associated with a load control device 112 and a load 104, such as, but not limited to, a light. The load control device 112 may be powered via line power from a building power source 102, and may provide power to the wireless occupancy sensor 100 via power line 114. The occupancy sensor may, in turn, provide occupancy signals to the load control device via signal lines 116. In turn, the load control device 112 may selectively energize the load 104 via power lines 118 upon receiving an "occupied" signal from the wireless occupancy sensor 100 along the signal lines 116. Although the wireless occupancy sensor 100 and load control device 112 are illustrated as being separated devices, it will be appreciated that the load control functionality can also be combined into the occupancy sensor.

The wireless occupancy sensor 100 may further include a processor 120 for controlling one or more configuration and/or operational aspects of the sensor and for commanding and decoding communication signals sent between the occupancy sensor and the load control device 112, and/or between the occupancy sensor and the remote device 108. In addition, the processor 120 may have local memory 122 associated therewith for storing information including, but not limited to, configuration and operational information transmitted from the remote device 108. The memory 122 may be any of a variety of volatile or non-volatile memory devices.

The wireless occupancy sensor 100 may further include a wireless transceiver 124 for receiving wireless signals from the remote device 108 and/or the load control device 112. The wireless transceiver 124 may be coupled to the processor 120 to enable the processor to use the information received from the remote device 108 via wireless signals 106 to adjust one or more configuration parameters of the occupancy sensor 100.

In some embodiments, the processor 120 can command the wireless transceiver 124 to transmit signals back to the remote device 108 or other device to provide operational and/or configuration information relating to the sensor 100. In one exemplary non-limiting embodiment, the transceiver 124 may provide an acknowledgement signal to the remote device 108 once a configuration step is completed. It will be appreciated that although the wireless transceiver is illustrated as a single element (i.e., chip), the wireless receiver and transmitter functionality may be provided as separate devices within the occupancy sensor 100.

In some embodiments, the wireless occupancy sensor 100 is hard wired to the other components of the system (power, load control device, load, etc.) to provide powering and signaling of an occupancy condition. In other embodiments, however, the wireless transceiver 124 may be completely wireless and may facilitate wireless occupancy signaling to a wireless load control device or other control device. In such embodiments, a separate power source, such as but not limited to, one or more batteries, PV cells, etc., may be used as a primary or back-up source of power to operate the occupancy sensor's circuitry.

As previously noted, a user can communicate with the wireless occupancy sensor 100 remotely using a device, such as but not limited to, a mobile device, tablet device, or desktop device, that has an internet browser. The user may connect to a particular wireless occupancy sensor 100 by typing in the sensor's IP address, and can configure the sensor remotely via the wireless transceiver 124 and processor 120. The wireless occupancy sensor 100 may also facilitate advanced features such as but not limited to, scheduling, zone control and dimming.

It will be appreciated that the system may include a plurality of occupancy sensors. For systems in which a plurality of wireless occupancy sensors 100 are provided, the individual sensors may be able to communicate with each other. For example, one sensor 100 may be coupled to a load control device (either internally or externally) so that it can operate to turn on/off a connected load based on its own occupancy signal or an occupancy signal received wirelessly from another wireless occupancy sensor 100. For applications having multiple wireless occupancy sensors 100, building management personnel may connect to each sensor remotely and set their schedules using a wireless router.

In further embodiments, the wireless occupancy sensor 100 may be able to communicate with other types of wireless devices such as, but not limited to, a wireless wall switch. In such cases, the wireless wall switch may be configured to override the occupancy sensor when the switch is turned on, and/or reset the wireless occupancy sensor 100 to normal operations when the switch is turned off.

In other embodiments, the wireless occupancy sensor 100 may serve as a wireless access point (e.g., a Wi-Fi hotspot), enabling router-less connection to the occupancy sensor. Such an arrangement may enable any device having Wi-Fi capability to wirelessly connect to the sensor. In one exemplary embodiment, the occupancy sensor 100 having such functionality could be controlled via a custom application ("App") or other software program residing on a mobile device. Alternatively, a web page based interface tool may be used, eliminating the need for an "App" or other software to be separately loaded, thus resulting in a platform independent configuration.

In one non-limiting exemplary embodiment, the user may review a list of available Wi-Fi networks on the remote device 106. The name of the wireless occupancy sensor 100 may appear in a screen list of available Wi-Fi options. To interface with a particular occupancy sensor, the user may simply select that sensor from the displayed list, and by entering a password may be connected to the individual occupancy sensor 100. Various configuration options may then be selected and adjusted as desired. In an alternative embodiment the user may open an internet browser on the remote device, whereupon the user will be able to access a web page associated with one or more occupancy sensors. The web page may be a homepage including a plurality of individual pages associated with individual occupancy sensors. The user may connect to the individual occupancy sensors via their associated individual web page. Alternatively, and as previously noted, the user may access an individual occupancy sensor by entering the particular sensor's IP address.

In some embodiments the disclosed sensor 100 may include a "locate" function, so that, once connected to the remote device 106, the device can be used to physically identify which occupancy sensor 100 it is configuring. The remote device 106 may include a softkey or other input arrangement that causes a signal to be sent to the occupancy sensor 100, in response to which the sensor emits a visual or audible indication. In some embodiments the indication may be a light (e.g., LED) or an audible sound (e.g., beep).

In a further alternative embodiment, a router may provided for connection to a group of occupancy sensors 100. With such an arrangement, the user can employ the remote device 106 to select the router from a list of available Wi-Fi networks. Thereafter, individual sensors associated with the router can be selected and configured using the remote device.

It will be appreciated that an advantage of the disclosed arrangement as compared to prior systems and devices is that a user can connect to one or more occupancy sensors directly, without requiring a separate network or an Internet connection (i.e., an access point connection). Thus, in some embodiments the remote device connects to a router, and the router provides access to the individual occupancy sensors (i.e., a client connection). In addition, the disclosed arrangement enables a user to go back and forth between a client connection arrangement and an access connection arrangement, which can be user set.

An exemplary remote configuration embodiment will now be described in relation to FIGS. 6A-6D. In an embodiment, the wireless transceiver 124 is a Wi-Fi transceiver capable of operating in a micro-Access Point (µAP) mode. The transceiver 124 may serve web pages to connected clients. As previously noted, a variety of sensor configurations/properties can be modifiable from the served web pages. A non-exclusive and non-limiting listing of such configurations/properties include setting a delay time for unoccupied mode, adjusting the sensor field of view, enabling/disabling test mode, enabling/disabling auto adapting functionality, enabling/disabling forced on/forced off mode, setting the sensor in different modes such as "auto on/off" or "manual on/off", setting up daylighting functionality, calibrating an associated photocell using auto or manual calibration, enabling/disabling a walk through mode, enabling/disabling dimming using pre-set light levels, adjusting sensor sensitivity, and the like. In some embodiments, the served web pages may enable the user to upgrade sensor and/or Wi-Fi transceiver firmware.

In some embodiments, the wireless network associated with the wireless occupancy sensor 100 may be secured with a user selectable password or passphrase. The status of one or more connected sensors 100 may be viewed by all connected users on their associated remote device. In addition, configuration settings may require an additional administrative password to be employed.

In an exemplary embodiment, commissioning of a wireless occupancy sensor 100 may be performed via a remote user device 108, such as but not limited to a laptop, PC, smartphone, or tablet loaded with an appropriate web-browser. The occupancy sensor 102 may include a Wi-Fi access point using b/g/n standards and Wi-Fi Protected Access (WPA) encryption. A service set identification (SSID) may be broadcast by default, where the SSID may include a device ID portion and a media access control (MAC) address portion.

Figure 6A:
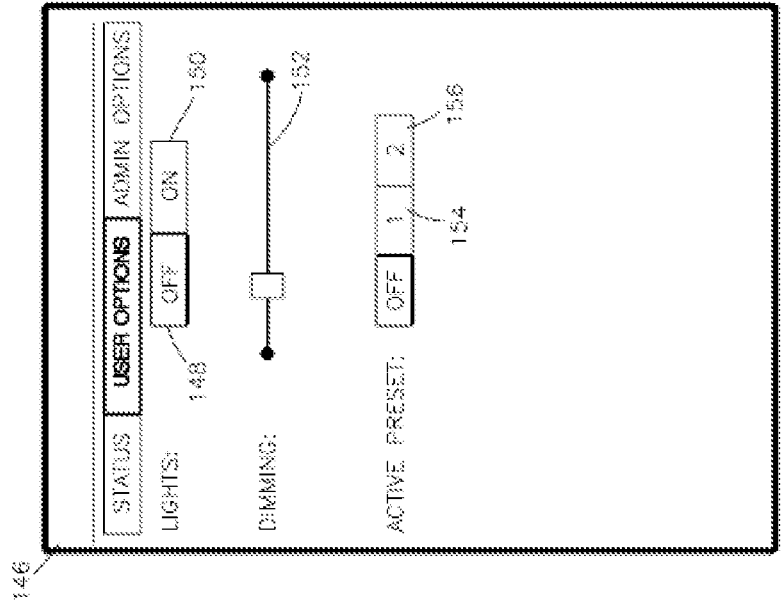

Hosted web pages may be size-appropriate for viewing the web page in a mobile browser (when the device is a smart phone or other small form factor device). FIG. 6A shows an exemplary "General Status" page 126, which may include information regarding the connected occupancy sensor 100, such as the device type 128, the device status 130, the occupancy status 132, the light level 134, the device status 136 and the MAC address 138. A "User Options" tab 140 and an "Administrator Options" tab 142 may also be included. A "Locate Device" soft key 144 may also be included, selection of which may cause the connected sensor 100 to emit an audible or visual alert to show its physical location, as previously described.

Although not shown, the remote device may display data that is representative of the operation of the occupancy sensor during a previous time period. Such information may be used to diagnose problems with the sensor (e.g., where the sensor has been turning the load on at an inordinate rate), or it may be used to determine occupancy rates for a monitored space (e.g., telling the user how many times an individual has entered the space on a given day).

Figure 6B:
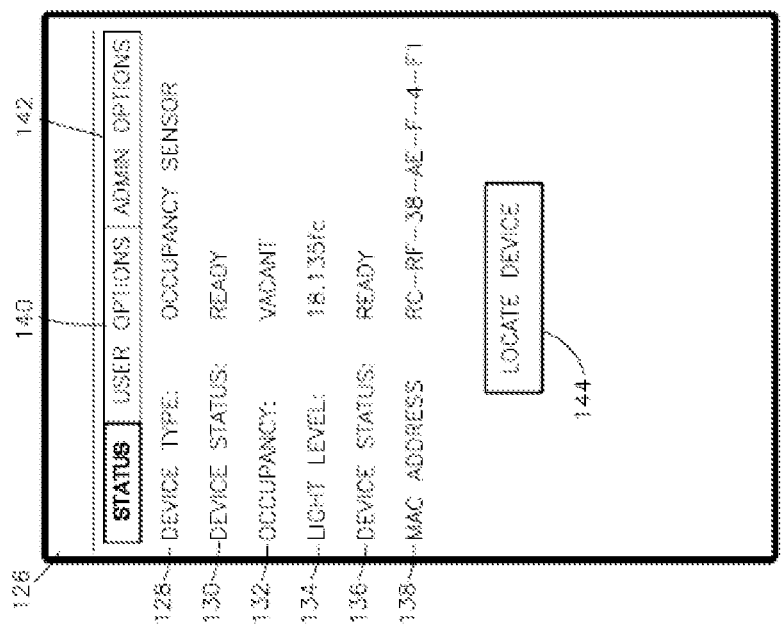

FIG. 6B shows an exemplary "User Options" page 146, which may be accessible by selecting the "User Options" tab 140 in the screen shown in FIG. 6A. This page may include a pair of soft keys 148, 150 enabling one or more connected loads 104 (i.e., lights) to be turned on or off. A dimming bar 152 may enable selective dimming of the associated load 104. A pair of preset softkeys 154, 156 are also be provided to enable the user to reset the occupancy sensor 100 to factory default settings, and/or to enable implementation of user preset settings.

FIG. 6C shows an exemplary "Admin Options" page 158, which may be accessible by selecting the "Admin Options" tab in the screen shown in FIG. 6A. This page may include an "Occupancy Sensor" soft key 160 operable for adjusting sensor settings that are typically controlled via manual inputs, such as trim pots, dip switches, and the like. Device presets may be configured and factory defaults may be restored on subsequent pages. A "Photocell Options" soft key 162 enables a user to adjust photocell configuration settings; and, a "Network" soft key 164 enables adjustment network settings, such as but not limited to, changing various passwords, changing an SSID, changing a Wi-Fi encryption password, adjusting radio power range (e.g., low, medium, high), displaying available networks, setting load control device options, setting wall switch options, setting scheduler options, and the like. FIG. 6D shows an example of an "Occupancy Sensor Configuration" page 166, which may include a "Tech Mode" soft key 168 for enabling an installer to check range, sensitivity, or other features of the sensor. A "Sensor Mode" soft key 170 is also shown for enabling activation/deactivation of one or more PIR, US, IR or other sensor elements of the occupancy sensor. An "Auto Adapting" soft key 172 may enable a user to enable/disable an auto adapting feature in which time delay and sensitivity settings are continually adjusted to occupant patterns of use. A "Walkthrough" soft key 174 may enable/disable a walkthrough mode of the occupancy sensor. Walkthrough mode may enable the sensor to turn the lights off shortly after the person leaves the room, and is useful when a room is typically only momentarily occupied. A "Test Mode" soft key 176 may enable the user to set a delayed-off time for an associated load to enable the user to perform a walk test of the monitored area. "Cancel" and "Save" soft keys 178, 180 are also provided to enable the user to cancel or save the selections made on the page 166.

Figure 7:
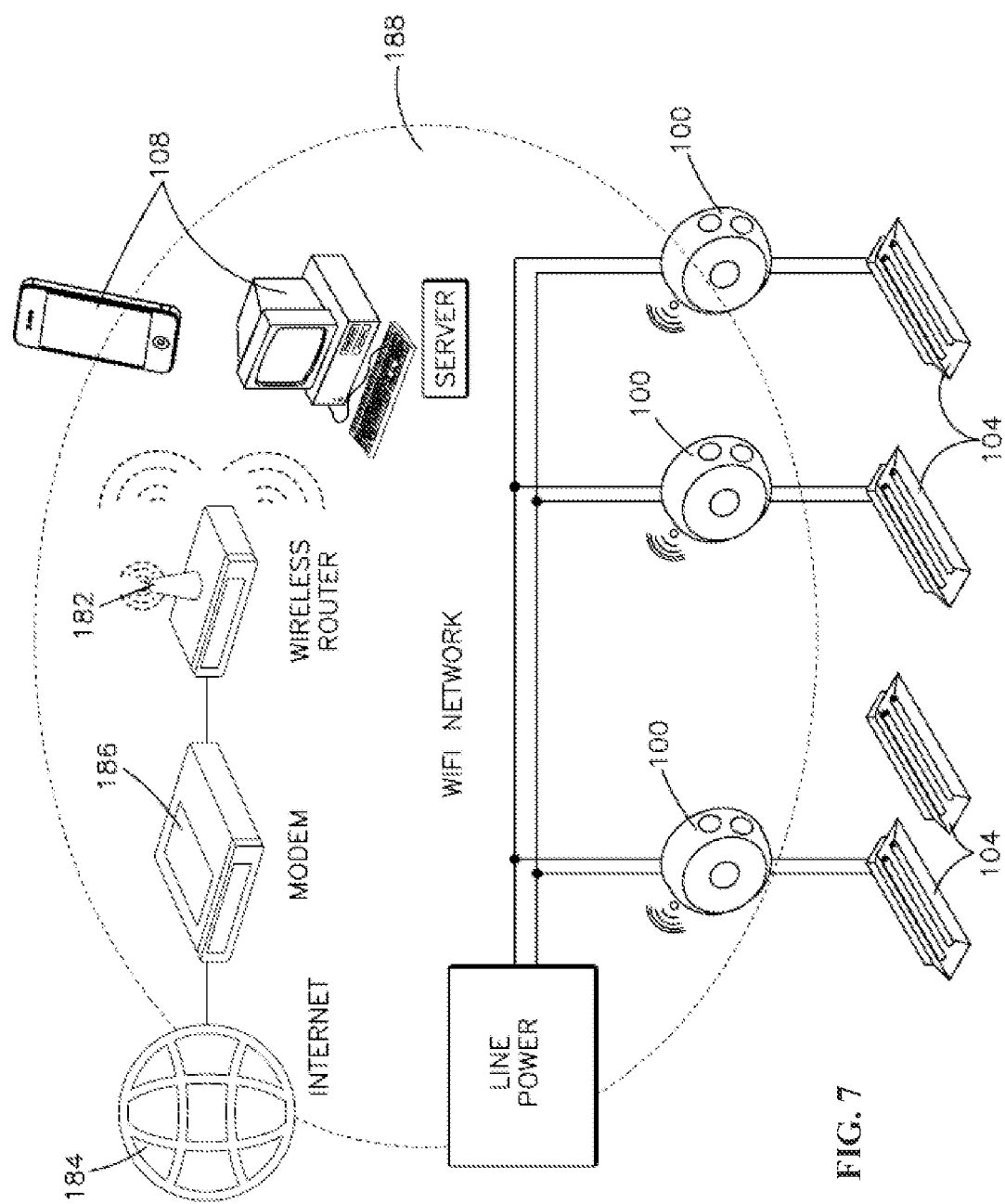
FIG. 7 is a schematic diagram of an occupancy sensing system according to a further embodiment.

FIG. 7 shows an exemplary embodiment in which the remote device 108 may include a Wi-Fi enabled laptop, PC, smart phone tablet, or the like running a standard web-browser. A wireless router 182 may provide wireless connectivity for the laptop, PC, smartphone tablet, etc. to enable connection to the Internet 184 via an appropriate modem 186. In one embodiment, an application running on the remote device 108 may be configured to query one or more of the wireless occupancy sensors 100 on the Wi-Fi network 188. The remote device 108 may then configure one or all of the wireless occupancy sensors 100, which are coupled to one or more loads 104, on the Wi-Fi network 188. Control of selected individual wireless occupancy sensors 100 may also be performed, including push/pull of settings to/from one or more sensors.

Figure 8B:
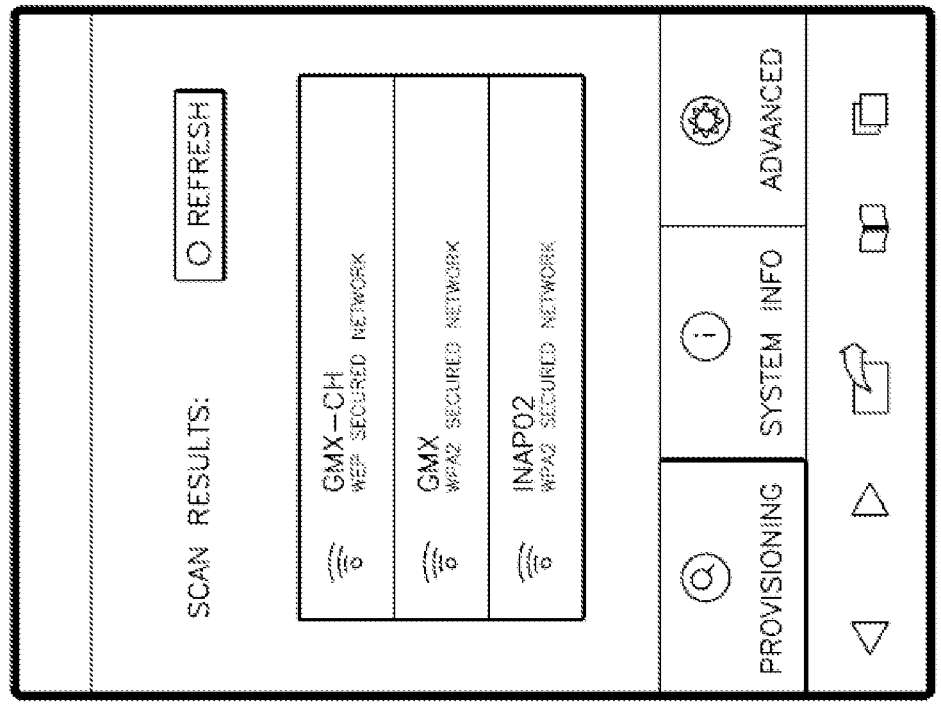
FIGS. 8A-8D are a series of screen shots from an exemplary smart phone illustrating steps for provisioning a device in a Wi-Fi network.
Figure 8A:
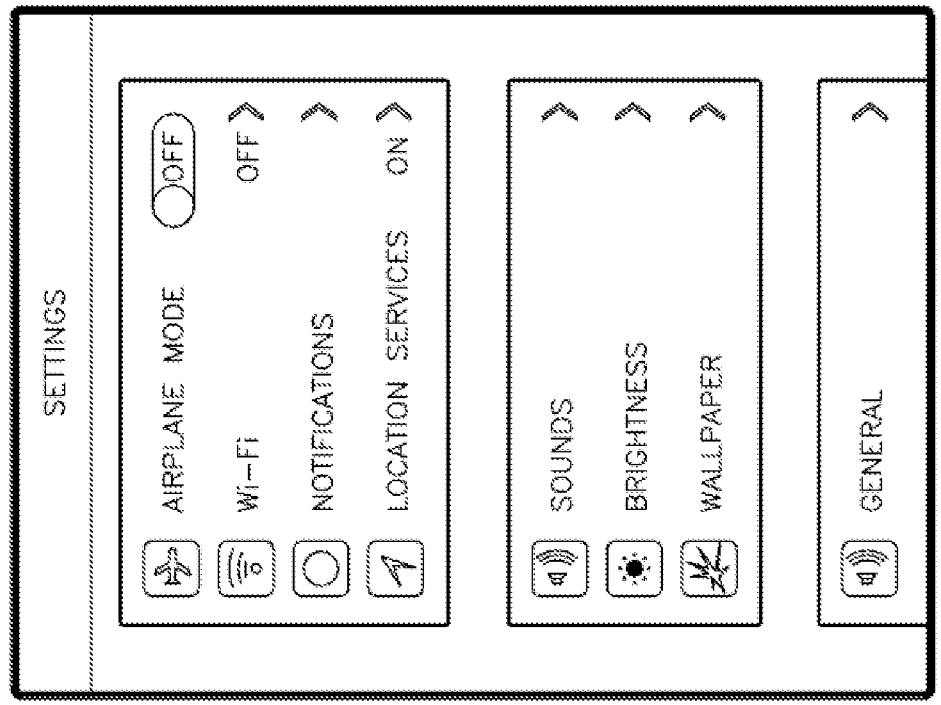
Figure 8D:
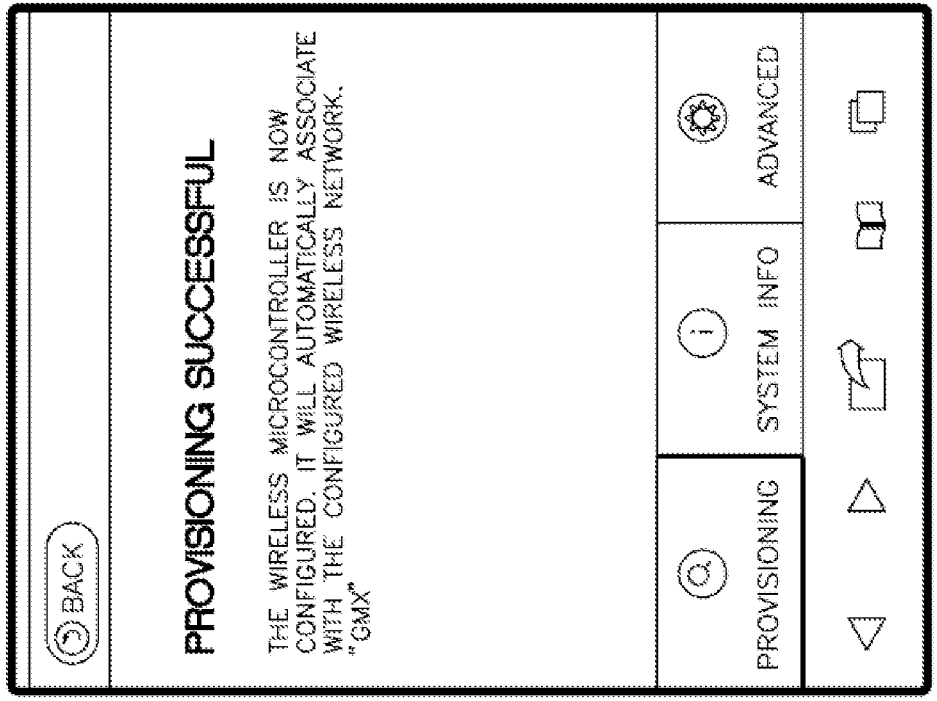
Figure 8C:
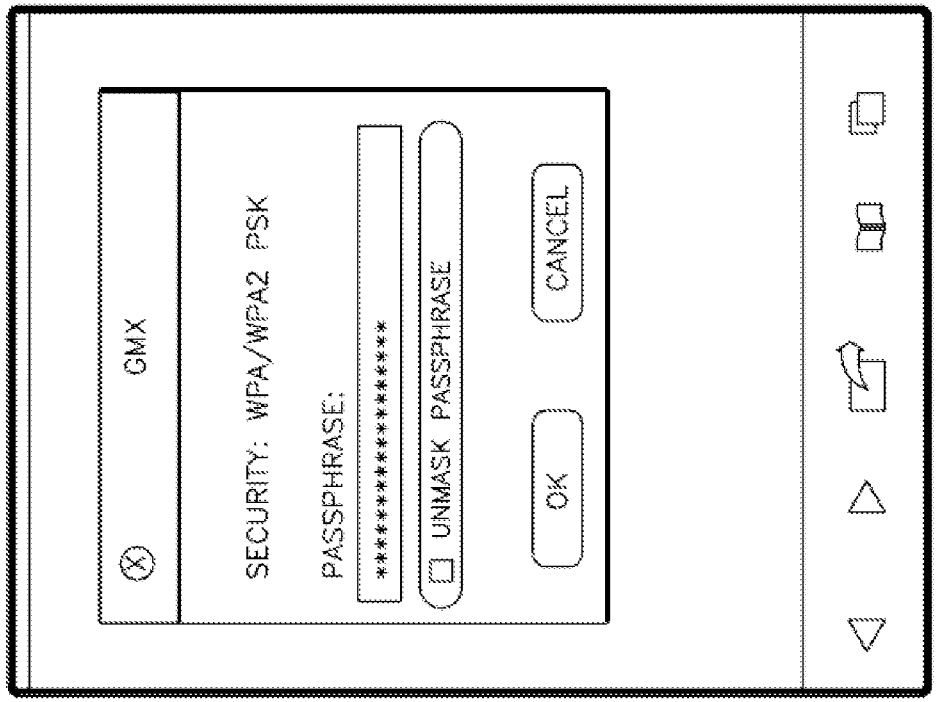

FIGS. 8A-8D show a plurality of screens on an exemplary smart phone illustrating exemplary provisioning steps for linking a remote device 108 to the Wi-Fi network 188 of FIG. 7. In FIG. 8A, the user is prompted to search for available Wi-Fi networks. In FIG. 8B, the network scan results return three different available networks. In FIG. 8C, the user selects network GMX (Wi-Fi network 188), and is prompted to enter an appropriate passphrase. In FIG. 8D the user is shown a message indicating that provisioning was successful.

The wireless transceiver 124 may use any of a variety of suitable wireless transmission technologies including infrared transmission using a standard from the Infrared Data Association (IrDA), RF transmission using one of the many standards developed by the Institute of Electrical and Electronic Engineers (IEEE), or any other standardized and/or proprietary wireless communication technology. In one non-limiting exemplary embodiment, the wireless transceiver 124 uses Wi-Fi technology.

The disclosed wireless occupancy sensor 100 may include any of a variety of sensor technologies, such as, but not limited to, passive infrared sensors, ultrasonic sensors, dual infrared-ultrasonic sensors, and the like. Further, the load 104 can be any of a variety of electrical loads, such as, but not limited to, lighting, heating, ventilation and the like.

Although the illustrated wireless occupancy sensor 100 includes a discrete processor 120, it will be appreciated that the appropriate logic for implementing the disclosed features of this sensor may also be embodied in appropriate hardwired circuitry associated with the occupancy sensor 100. Thus, the logic associated with this embodiment can be in hardware, software, or a combination of the two. It will further be appreciated that the occupancy sensor 100 may also include any or all of the features of the embodiments described in relation to FIGS. 1-3 and 9-14.

It will be appreciated that one or more of the features disclosed in relation to FIGS. 4-8D are not limited to occupancy sensors. Thus, any or all of the Wi-Fi features described in relation to FIGS. 4-8D could alternatively be implemented in a load control device (i.e., a powerpack), a photocell or any other lighting control device.

Low voltage occupancy sensors are sensors without a relay, and as such they cannot directly control a connected load. In order to control a connected load, low voltage occupancy sensors must be connected to a load control device (i.e., a power pack) having a relay. Thus, for applications that require multiple occupancy sensors (e.g., large halls, multiple entrance rooms, or stairways), a plurality of low voltage occupancy sensors are often used in combination with a separate load control device. Low voltage occupancy sensors require little power to operate, and the load control device switches the load on/off in response to a signal from the occupancy sensors.

Line voltage sensors commonly include sensors and relays; and, line voltage sensors are typically used for single-room single-sensor applications. In addition, current line voltage occupancy sensors do not provide a low voltage output and an interface for low voltage sensors.

Figure 9:
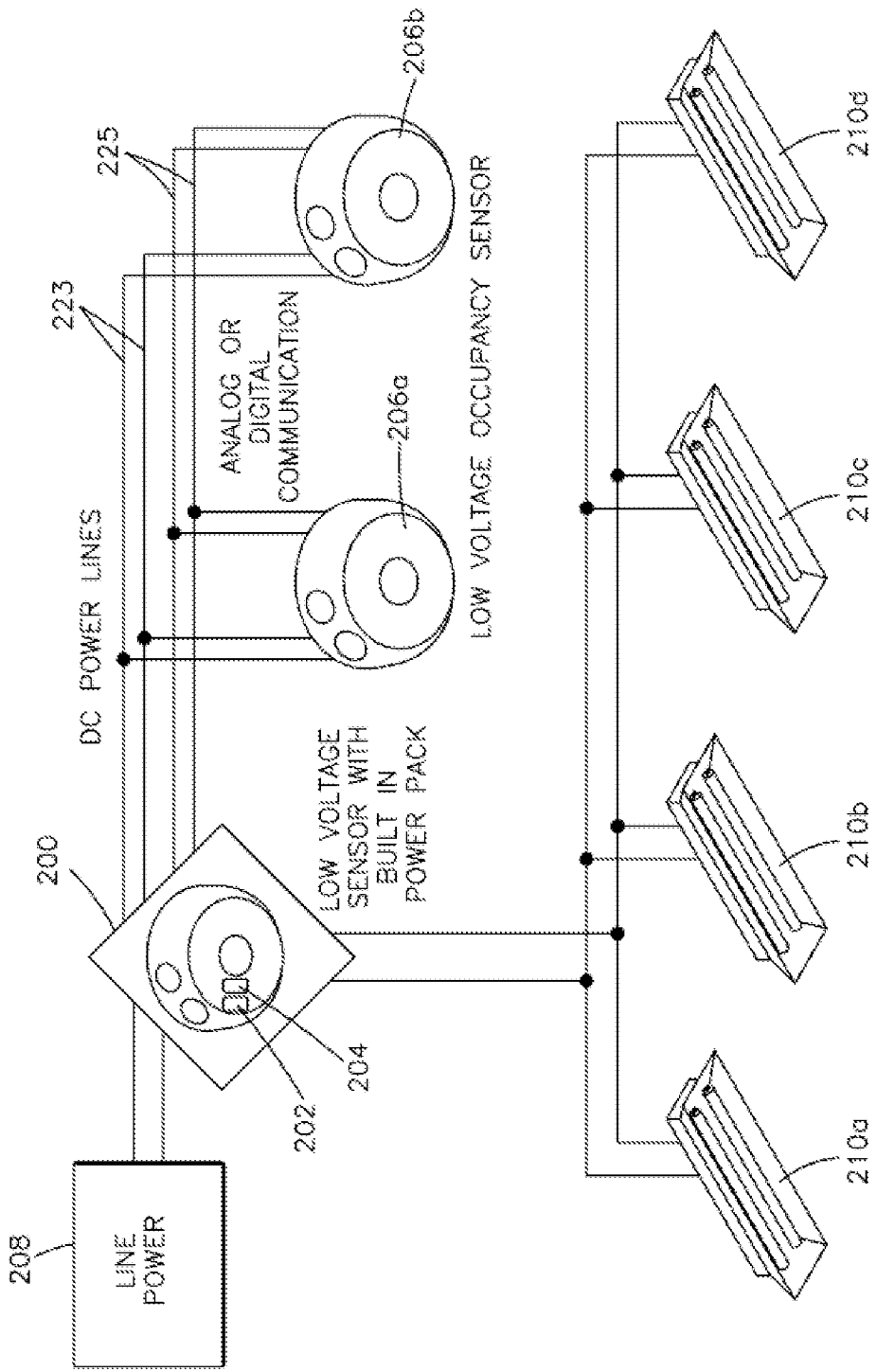
FIG. 9 is a schematic showing a line voltage sensor according to an embodiment of the disclosure.
Figure 10:
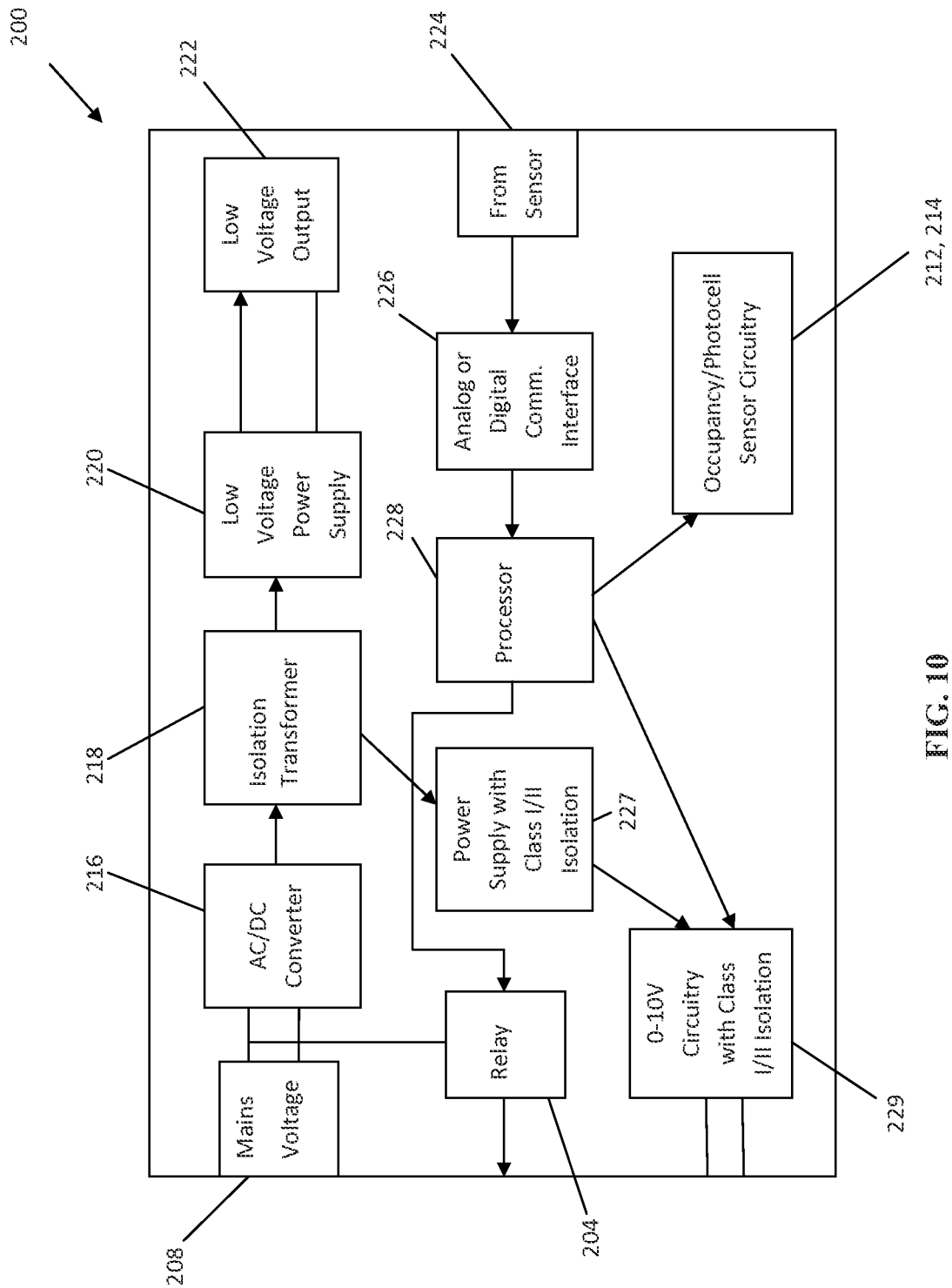
FIG. 10 is a block diagram illustrating the line voltage sensor of FIG. 9.
Figure 11:
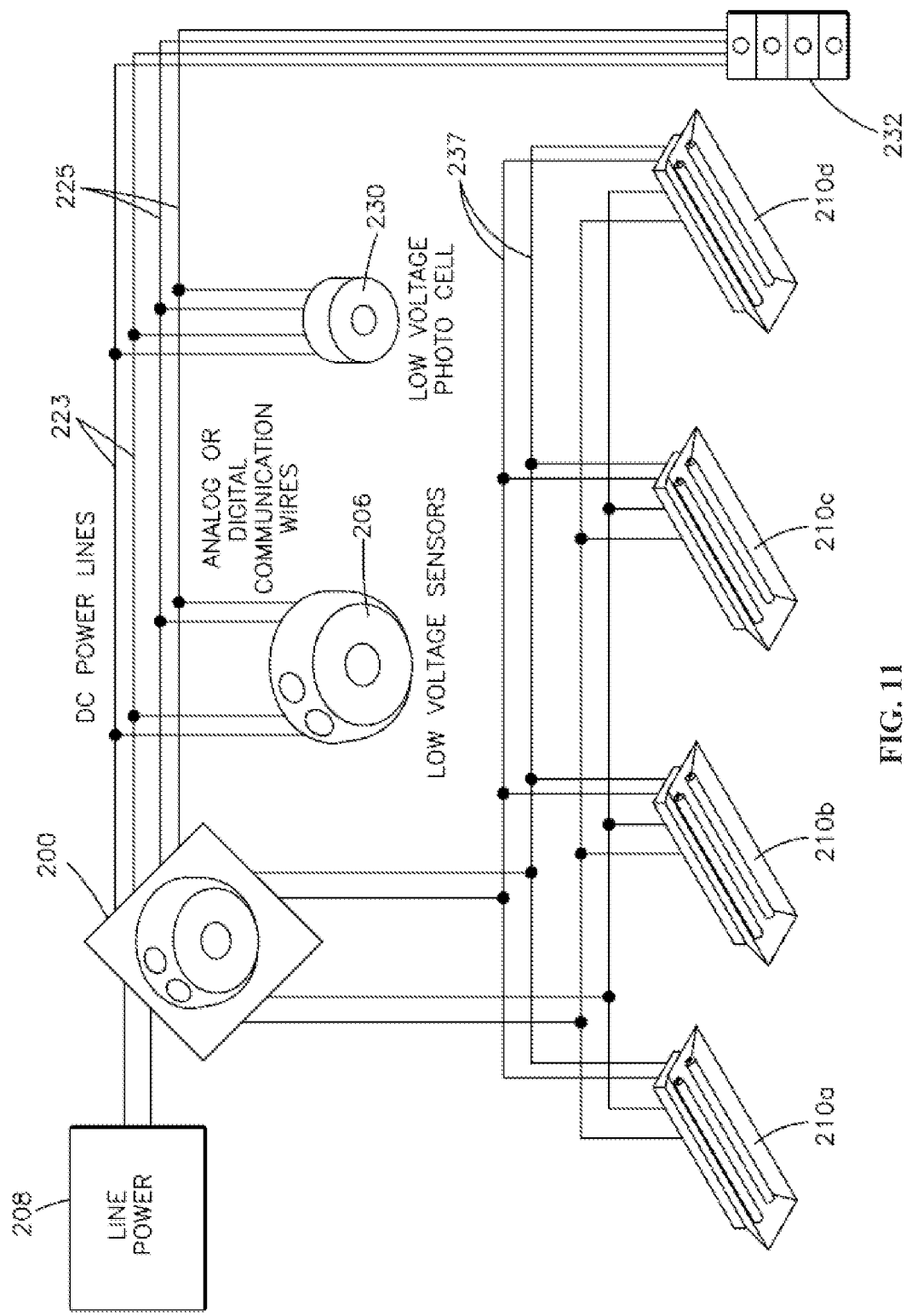
FIG. 11 is a schematic showing a line voltage sensor according to a further embodiment.

Referring to FIGS. 9-11, a line voltage occupancy sensor 200 is disclosed including at least one load control device 202 and at least one relay 204. As will be described, the disclosed line voltage occupancy sensor 200 can be used to power one or more low voltage occupancy sensors 206 without the need for a separate load control device. That is, the line voltage occupancy sensor 200 can act as a load control device for the associated low voltage occupancy sensors 206*a-b*.

As shown in FIG. 9, the line voltage occupancy sensor 200 is connected to a building main power supply 208. The line voltage occupancy sensor 200 receives the line voltage from the building main power supply 208, and transforms the line voltage in order to power a plurality of low voltage occupancy sensors 206*a-b*. The line voltage occupancy sensor 200 may also provide power directly to one or more connected loads 210*a-d*. FIG. 9 shows two low voltage occupancy sensors 206*a-b* and four loads 210*a-d*, but it will be appreciated that any number of low voltage occupancy sensors and/or loads may be used.

In one embodiment, shown in FIG. 10, the disclosed line voltage occupancy sensor 200 may include an occupancy sensor element 212 and a photocell 214. The sensor 200 receives power from a main power supply 208 and converts it to low voltage DC power using an AC/DC converter 216 and isolation transformer 218. A low voltage power supply 220 having a low voltage output interface 222 is employed to provide power to one or more low voltage occupancy sensors 206 via DC power wires 223.

To receive operational signals from the connected low voltage occupancy sensors 206, the line voltage occupancy sensor 200 may also include at least one input interface 224 that is configured to couple with one or more analog or digital communication wires 225 (FIG. 9). The input interface 224 is coupled to an analog/digital (A/D) communication interface 226 so that analog signals from the low voltage sensors (via communications lines 225) may be converted to digital signal as required before being transmitted to the sensor's processor 228. Thus arranged, the processor 228 may command the sensor relay 204 to provide power to one or more connected loads 210a-d based on signals received from the low voltage occupancy sensors 206a-b.

The line voltage sensor 200 may also include components and circuitry for providing dimming of the connected loads 210a-d. In one embodiment, a power supply 226 may be coupled between the isolation transformer 218 and 0-10 Volt circuitry 229. The 0-10 Volt circuitry 229 may be also coupled to the processor 228. Based on the signals received from one or more of the low voltage occupancy sensors 206a-b, the processor may control the 0-10V circuitry 229 to provide less than full power to the connected loads 210a-d. In this manner, the connected loads can be dimmed. In one embodiment the line voltage sensor 200 can include an appropriate dimming circuitry to facilitate dimming of one or more connected low voltage sensors 206. Alternatively, or in addition, the line voltage sensor 200 can include a power supply that powers the low voltage sensors 206.

As shown in FIG. 11, the line voltage occupancy sensor 200 can also be used to power a low voltage photo cell 230 and/or a low voltage switch station 232 via power lines 223. In addition, the line voltage occupancy sensor 200 can receive analog or digital signals from these components as well as from the low voltage occupancy sensor 206 via communication lines 225. Separate dimming wiring 227 may also be included between the line voltage occupancy sensor 200 and the connected loads 210a-d for providing the aforementioned dimming functionality.

Although the illustrated embodiment shows a line voltage occupancy sensor 200 having a single relay, load control elements, and interfaces, it will be appreciated that the sensor 200 can be provided with multiple relays, multiple sets of load control elements, and multiple interfaces to enable the sensor 200 to act as a load control device for a large number of low voltage occupancy sensors and/or other low voltage devices.

As will be appreciated, the disclosed line voltage occupancy sensor 200 may have expanded uses as compared to conventional line voltage sensors, enabling it to be extended to large area applications. By integrating a low voltage power supply (i.e., a power pack), the disclosed sensor 200 can supply power to a plurality of low voltage occupancy sensors that can be positioned at various locations within a large space. By including an interface to receive an output from each of the low voltage occupancy sensors, the disclosed sensor 200 can receive signals from the one or more of the low voltage occupancy sensors and can control the associated load(s) in response thereto. Thus, the disclosed arrangement offers a simplified and lower cost solution as compared to current arrangements, as the need for a separate power pack is eliminated, and the line voltage occupancy sensor takes its place.

As will be appreciated, the disclosed sensor 200 can be used to power (and to receive operational signals from) greater or fewer numbers of low voltage occupancy sensors, photocells, and wall switches as are shown in FIGS. 9-11. In addition, other low voltage devices in addition to low voltage occupancy sensors, photocells and wall switches may also be powered using the disclosed sensor 200. Although the illustrated occupancy sensor 200 includes a discrete processor 228, it will be appreciated that the appropriate logic for implementing the disclosed features of this sensor may also be embodied in appropriate hardwired circuitry associated with the occupancy sensing element 212. Thus, the logic associated with this embodiment can be in hardware, software, or a combination of the two. It will further be appreciated that the occupancy sensor 200 may also include any or all of the features of the embodiments described in relation to FIGS. 1-8 and 12-14.

Figure 12:
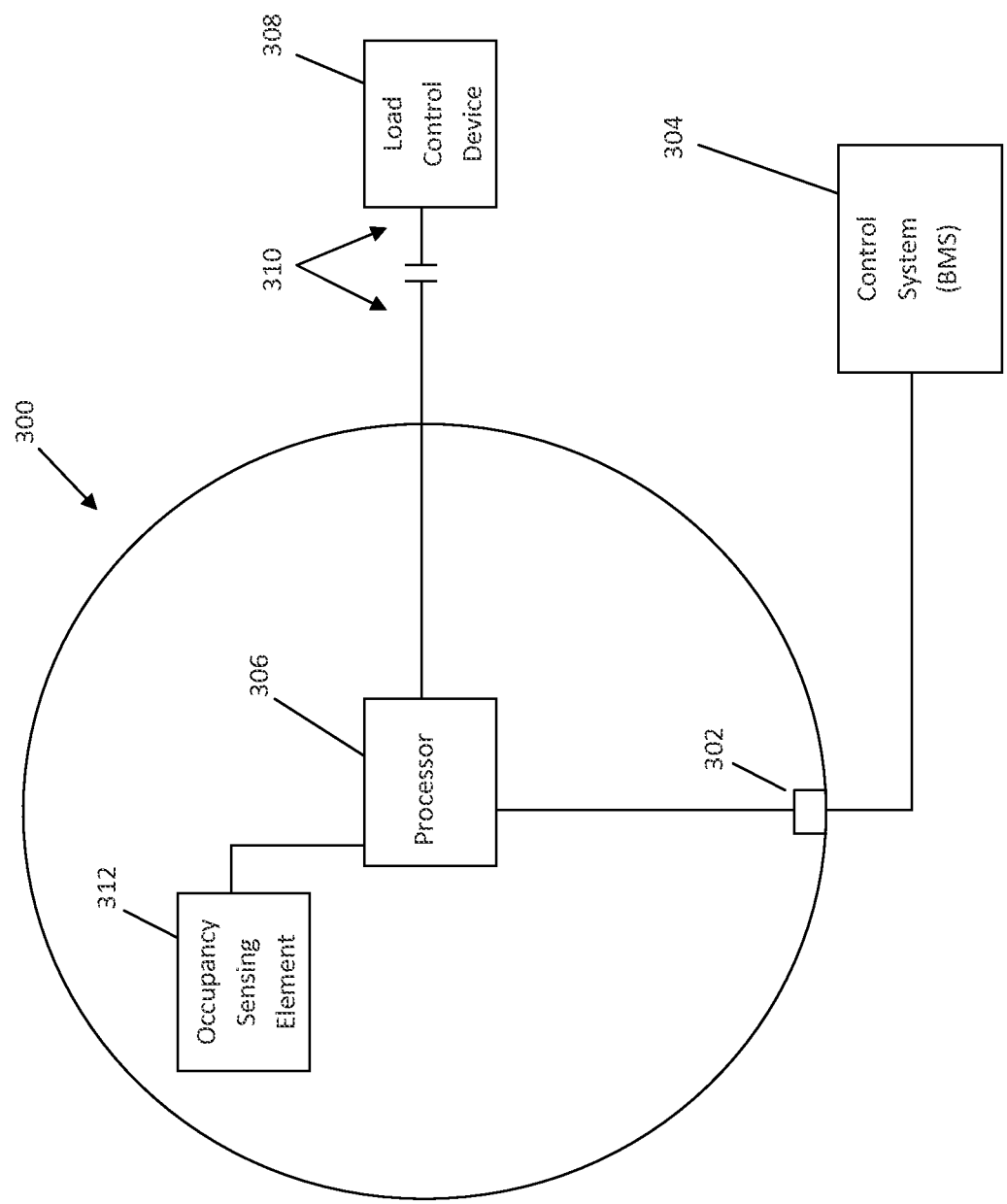
FIG. 12 is a schematic of an occupancy sensor according to a further embodiment.

Referring to FIG. 12, an occupancy sensor 300 is includes an integral emergency interface 302 to a control system 304 that is capable of overriding the sensor's normal functionality under emergency conditions. In one embodiment, the control system 304 is a building automation system or building management system (hereafter "BMS"). The BMS is used to provide real time management of, and access to, systems such as lighting, HVAC, fire, security and the like. Under emergency conditions, such as (but not limited to) when a fire condition is detected in a building, it is desirable to enable the BMS to override the normal operation of the occupancy sensors positioned throughout the building to ensure that the lights are on to aid emergency personnel, such as firemen as well as security personnel.

The emergency interface 302 is integral to the occupancy sensor 300, and enables the BMS 304 to energize a load associated with the sensor and the load control device 308. In the illustrated embodiment, the emergency interface 302 couples the BMS 304 to the sensor's processor 306, though this is not critical, and in some embodiments, the interface 302 may enable the BMS 304 to communicate directly with the load control device 308 via communication link 310. As arranged, under emergency conditions the BMS 304 can operate to force the occupancy sensor to energize the load(s) associated with the load control device 308, thus ensuring that the associated load remains powered, regardless of the occupancy status of the monitored space.

As will be appreciated, providing an integral emergency interface 302 in the occupancy sensor 300 eliminates the need for an external interface to ensure that the BMS can control all of the lighting in a building under emergency conditions. This is an advantage over current occupancy sensors which require a separate external interface component in order to couple to the BMS 304.

Although the illustrated occupancy sensor 300 includes a discrete processor 306, it will be appreciated that the appropriate logic for implementing the disclosed features of this sensor may also be embodied in appropriate hardwired circuitry associated with the occupancy sensing element 312. Thus, the logic associated with this embodiment can be in hardware, software, or a combination of the two. It will further be appreciated that the occupancy sensor 300 may also include any or all of the features of the embodiments described in relation to FIGS. 1-11, 13 and 14.

Figure 13:
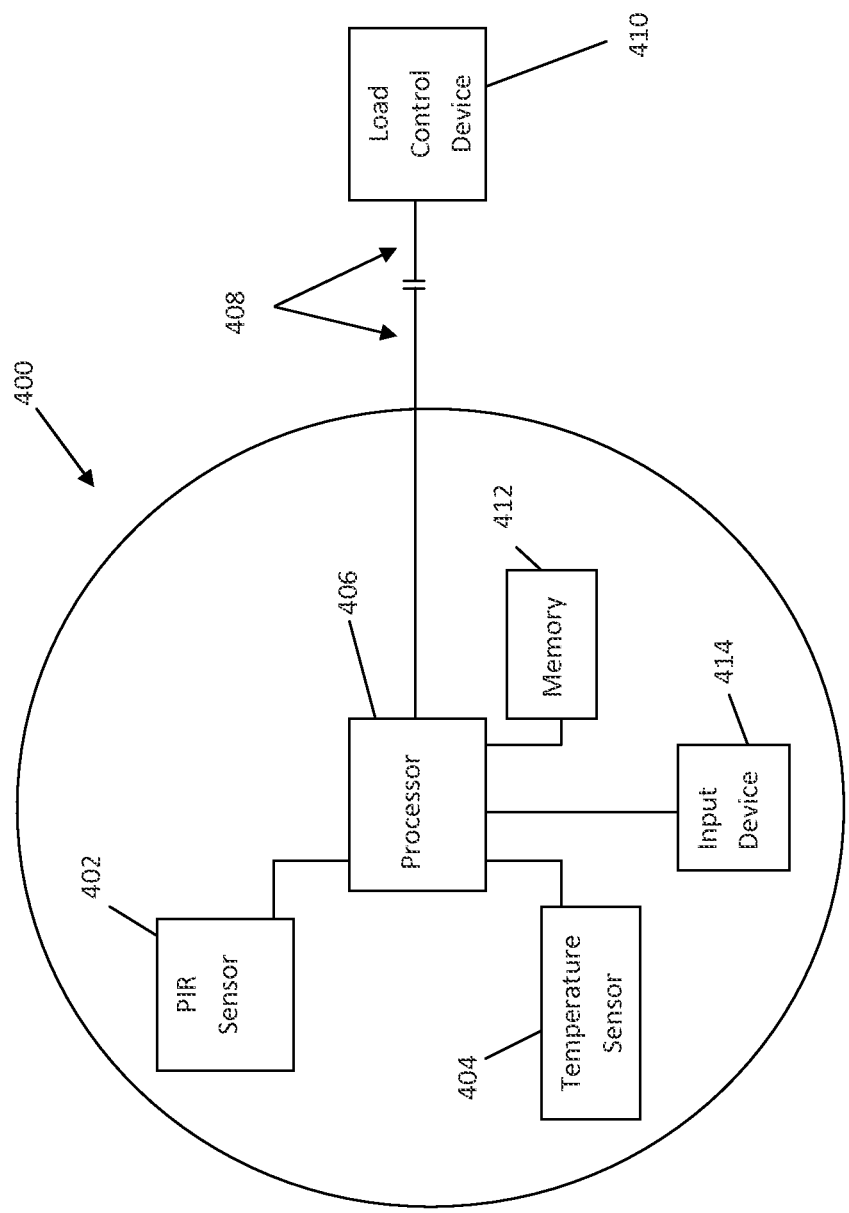
FIG. 13 is a schematic of an occupancy sensor according to a further embodiment.

Referring to FIG. 13, an occupancy sensor 400 is disclosed that actively adjusts an occupant sensing threshold to account for changes in ambient temperatures in a monitored space. Passive infrared (PIR) occupancy sensors operate by sensing a body having a heat signature in excess of background infrared (IR) levels. That is, PIR sensors observe a difference in temperature between the body and the background and they register that as a change. Depending on the magnitude of this change, logic built into the PIR occupancy sensor either ignores the change if it is below a certain threshold, or causes an "occupied" signal to be issued if the change is above the threshold required to signify an occupied condition. As the ambient temperature of a monitored space rises, the difference between human body temperature and the ambient temperature decreases, and as a result PIR occupancy sensors can be less able to differentiate the heat of a human body from the heat of the surroundings. This may be particularly acute where the occupancy sensor is deployed in a hot climate where the temperature of the monitored space can be very high if air conditioning is not in use.

The disclosed occupancy sensor 400 thus may include a passive infrared (PIR) sensing element 402 and a temperature sensing element 404 coupled to a processor 406. Based on the received temperature information from the temperature sensing element 404, the processor 406 can adjust a sensing threshold required to transmit an "occupied" signal along a wired or wireless communications channel 408 to a load control device 410 associated with the monitored space.

In one non-limiting exemplary embodiment, the processor 406 uses information from the temperature sensing element 404 to adjust a sensing threshold so that a greater or lesser temperature differential between the monitored space and a sensed body must be exceeded before an occupied condition is signaled and an associated load is energized. In one embodiment, as the temperature of the monitored space increases (as sensed by the temperature sensing element 404), the processor 406 decreases the temperature differential required to signal an occupied condition.

In one non-limiting exemplary embodiment, the processor 406 employs an algorithm to adjust this threshold. In other embodiments, adjustment values are provided in a lookup table in non-volatile memory 412 associated with the processor 406. Adjustment values could be stored in a look up table associated with the processor 406. In yet another embodiment, the threshold adjustment may be manually entered via a user input device 414 such as a dip switch, trim pot, rotary switch, or the like.

Although the illustrated embodiment shows the temperature sensing element 404 as being internal to the occupancy sensor 400, it will be appreciated that the temperature sensing element could alternatively be an external device. Such an arrangement may be appropriate when using an analog PIR sensing element 402. In such cases, the temperature sensing element 404 may be any appropriate temperature sensing device, such as a thermocouple, a resistance temperature detector (RTD), a thermistor, or the like. When using a digital PIR sensing element 402, the digital PIR sensor itself may provide the desired temperature data for use by the processor 406, and thus a discrete temperature sensing element 404 may not be required.

Although the illustrated occupancy sensor 400 includes a discrete processor 406, it will be appreciated that the appropriate logic for implementing the disclosed features of this sensor may also be embodied in appropriate hardwired circuitry associated with the PIR sensing element 402. Thus, the logic associated with this embodiment can be in hardware, software, or a combination of the two. It will further be appreciated that the occupancy sensor 400 may also include any or all of the features of the embodiments described in relation to FIGS. 1-12 and 14.

Figure 14:
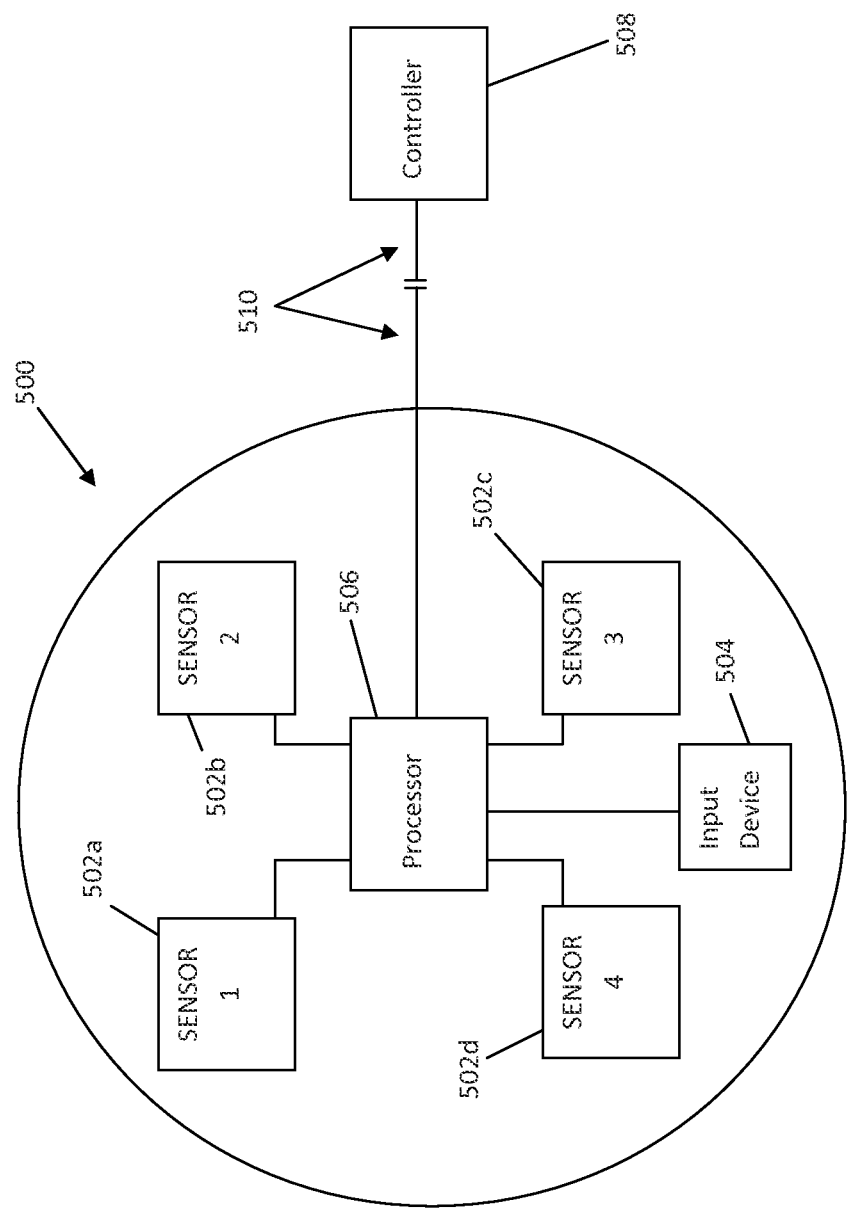
FIG. 14 is a schematic of an occupancy sensor according to a further embodiment.

Referring to FIG. 14, a directional occupancy sensor 500 is disclosed having a plurality of sensor elements 502a-d, each of which is positioned at a different "corner" of the sensor 500, so that each element is responsible for sensing occupancy in a particular portion of a covered space. The disclosed occupancy sensor 500 can thus discern from which portion of the space occupancy is sensed. Lighting control may be adjusted (i.e., turned on or off or dimmed) based on the portion of the space in which occupancy is sensed.

Since different sensor elements 502a-d are employed to cover different portions of the covered space, the coverage area of the occupancy sensor 500 can be adjusted by switching on or off particular sensor elements 502a-d, eliminating the need for using masking inserts. In one embodiment, each sensor element 502a-d is associated with an individual channel. The individual channels can be turned on or off via a user input device 504 such as a dip switch, trip pot, rotary switch or the like. This enables the user to selectively turn on/off particular sensor elements 502a-d so that occupancy is detected in fewer than all portions of the covered spaces. Channel operation can also or alternatively be adjusted using an associated processor 506 coupled to a local or remote controller 508 via a wired or wireless communications channel 510.

One or more sensor elements 502a-d may be associated with a single channel, and thus one or more portions of the occupancy sensor 500 may be turned on or off by adjusting a single channel. The disclosed arrangement is advantageous for applications in which, for example, one of the sensor elements 502a is positioned to "look" toward a doorway, while the remaining sensor elements 502b-d are positioned to "look" at the interior portions of the covered space. In such a case, the channel associated with sensor element 502a could be turned off so that movements attributable to people in a hallway adjacent to the door would not be sensed. This would eliminate instances in which a person passing by the door causes the lights in the room to be turned on even though no one is present in the covered space.

In one embodiment the sensor elements are passive infrared (PIR) sensors, however, it will be appreciated that other types of sensing elements may be used such as ultrasonic, acoustic, video and the like. In addition, the occupancy sensor 500 may include combinations of different types of sensing elements. Moreover, although the illustrated embodiment shows four individual sensing elements 502a-d, the occupancy sensor 500 could include fewer or greater than four elements.

Although the illustrated occupancy sensor 500 includes a discrete processor 506, it will be appreciated that the appropriate logic for implementing the disclosed features of this sensor may also be embodied in appropriate hardwired circuitry associated with the individual sensing elements 502a-d. Thus, the logic associated with this embodiment can be in hardware, software, or a combination of the two. It will be appreciated that the occupancy sensor 500 may also include any or all of the features of the embodiments described in relation to FIGS. 1-13.

Figure 15:
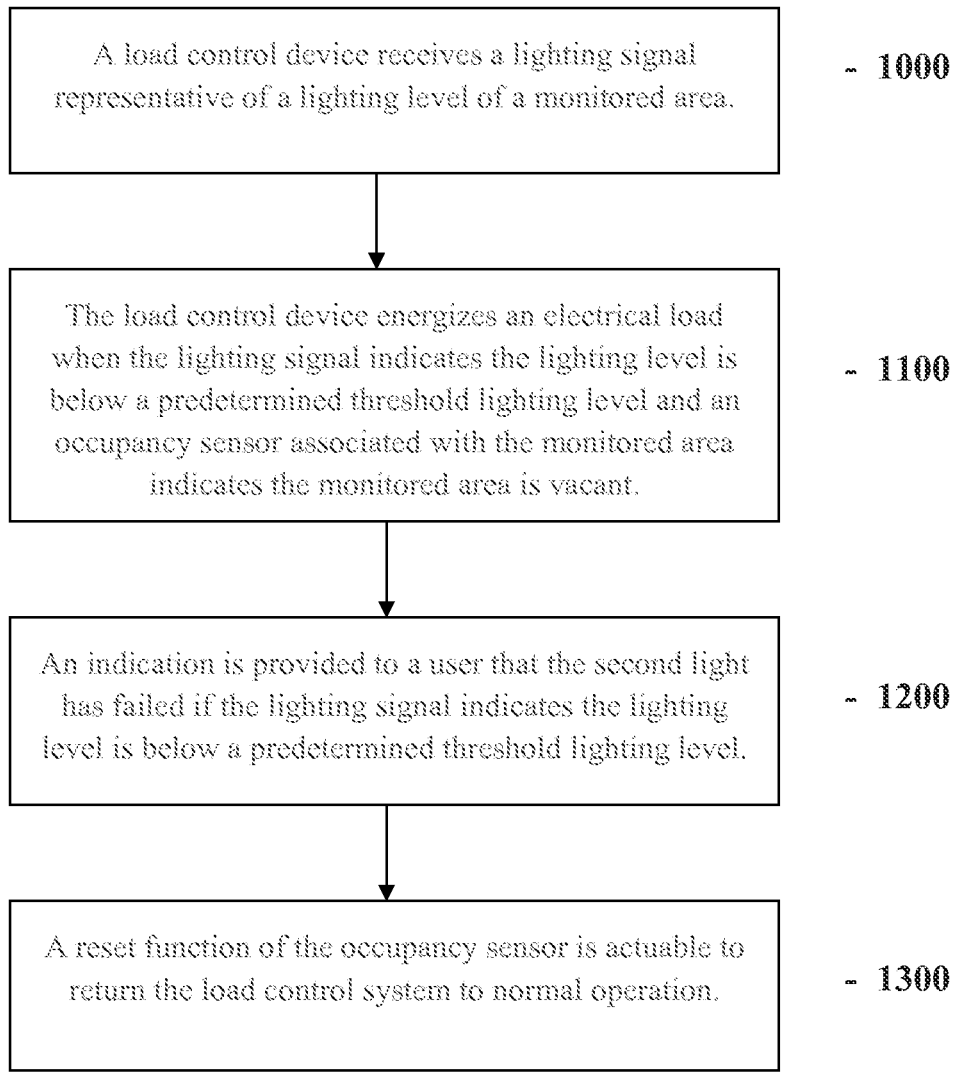
FIG. 15 is a logic diagram illustrating an exemplary embodiment of the disclosed method.

An exemplary method for controlling an electrical load will now be described in relation to FIG. 15. At step 1000, a load control device receives a lighting signal representative of a lighting level of a monitored area. At step 1100, the load control device energizes an electrical load when the lighting signal indicates the lighting level is below a predetermined threshold lighting level and an occupancy sensor associated with the monitored area indicates the monitored area is vacant. In some embodiments, the electrical load is a first light having a relatively high-intensity level. A second light, having a relatively lower intensity level than the intensity level of the first light, may also be provided, and the predetermined threshold lighting level may be associated with a second tight. At step 1200, an indication is provided to a user that the second light has failed if the lighting signal indicates the lighting level is below a predetermined threshold lighting level. In some embodiments the indication to a user is commanded from the occupancy sensor via at least one of e-mail, text message, voice message or web page. At step 1300, a reset function of the occupancy sensor is actuatable to return the load control system to normal operation. In one embodiment, the reset function may be actuatable by replacing the second light.

Figure 16:
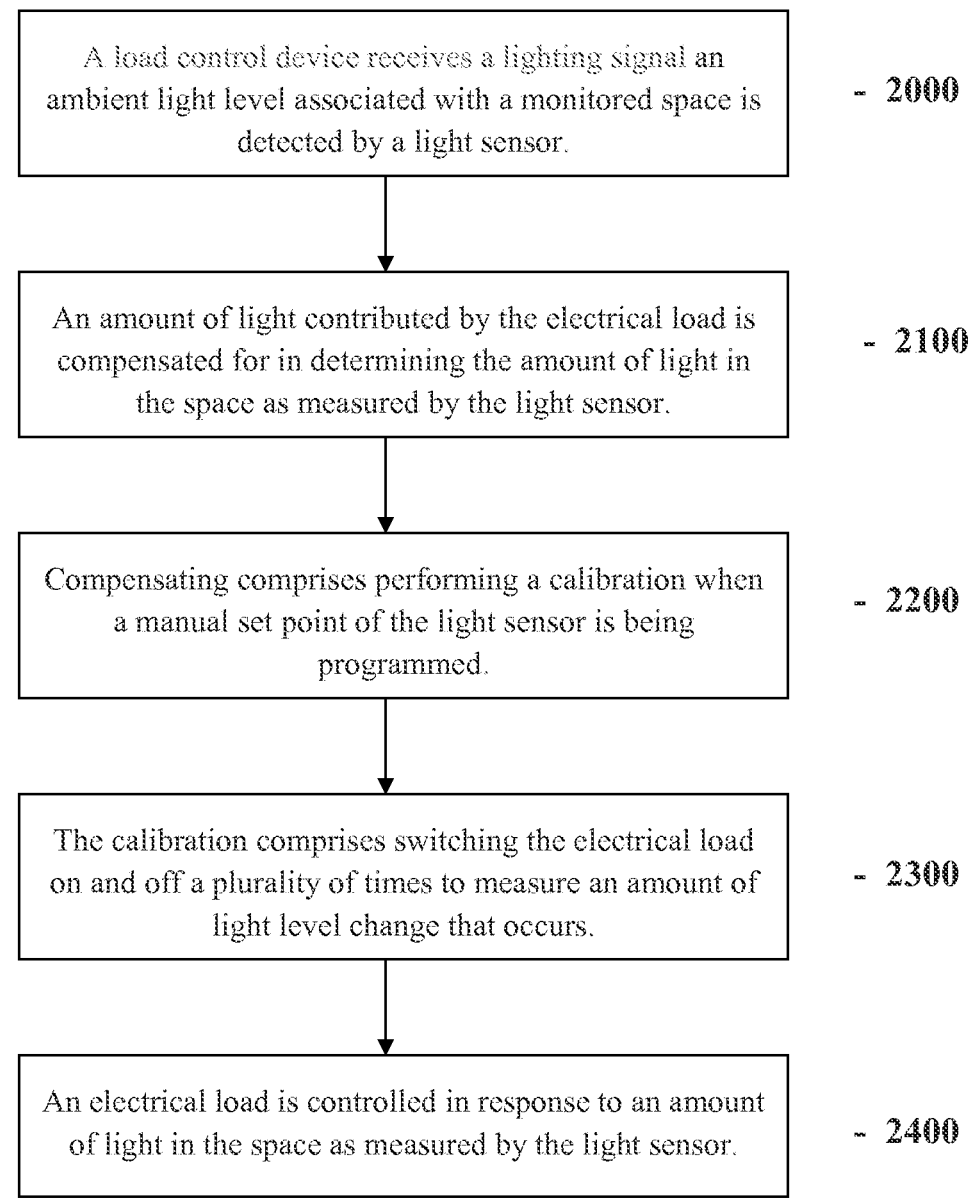
FIG. 16 is a logic diagram illustrating another exemplary embodiment of the disclosed method.

An exemplary alternative method for controlling an electrical load will now be described in relation to FIG. 16. At step 2000, an ambient light level associated with a monitored space is detected by a light sensor. At step 2100, an amount of light contributed by the electrical load is compensated for in determining the amount of light in the space as measured by the light sensor. At step 2200, this compensating may include performing a calibration when a manual set point of the light sensor is being programmed. At step 2300, the calibration may include switching the electrical load on and off a plurality of times to measure an amount of light level change that occurs. In further embodiments, the calibration may include adjusting a hysteresis value to be an amount greater than said light level change. At step 2400, an electrical load is controlled in response to an amount of light in the space as measured by the light sensor. In some embodiments, the electrical load is controlled to be in a de-energized or dimmed state when the measured amount of light in the space exceeds a predetermined level. In other embodiments, the electrical load is controlled to be in a dimmed or de-energized state regardless of the occupancy condition of the monitored space.

Figure 17:
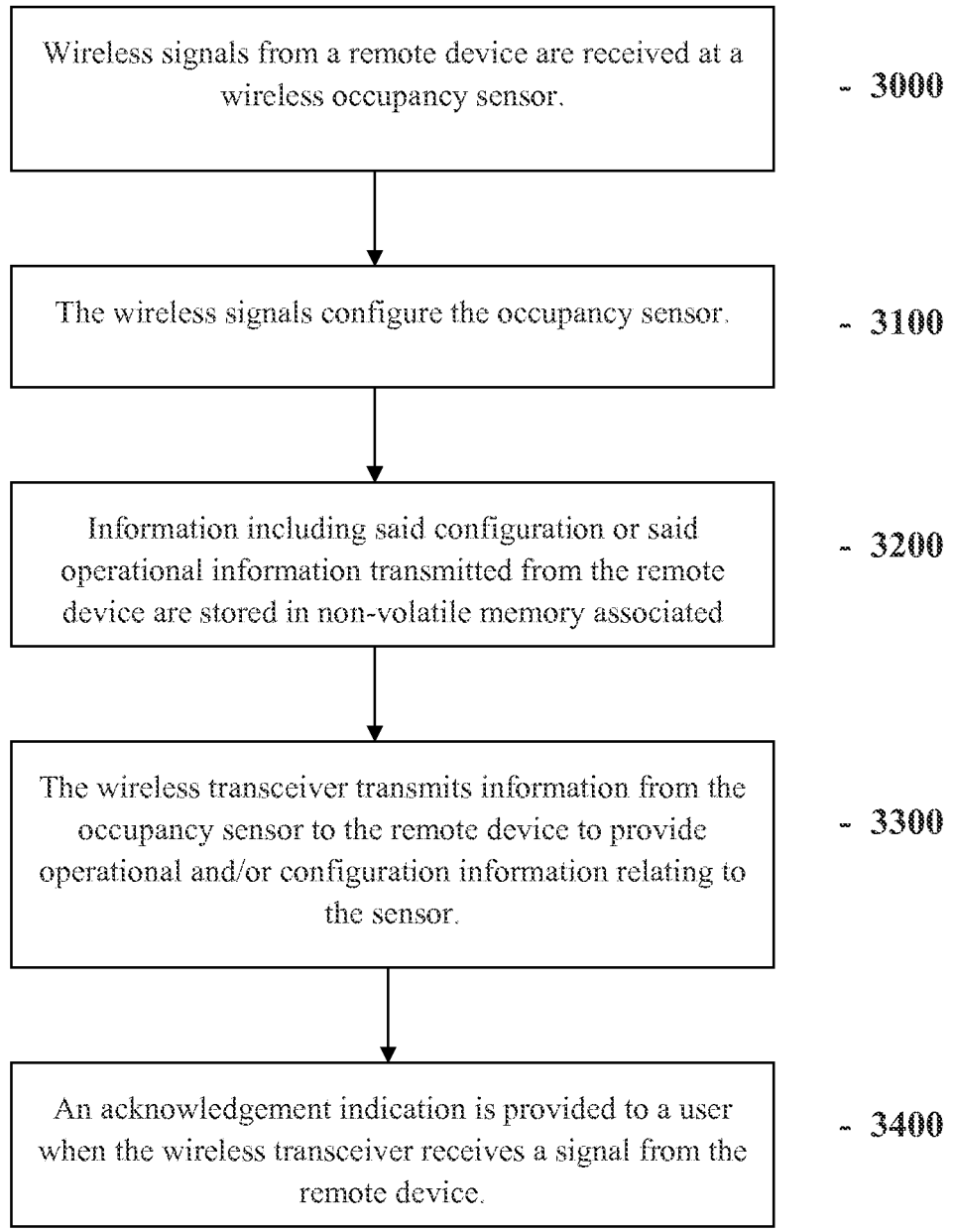
FIG. 17 is a logic diagram illustrating a further exemplary embodiment of the disclosed method.

An exemplary further method for controlling a load with a wireless occupancy sensor will now be described in relation to FIG. 17. At step 3000, wireless signals from a remote device are received at a wireless occupancy sensor. At step 3100, the wireless signals configure the occupancy sensor. In some embodiments, a processor in communication with a wireless transceiver control a configuration or an operational characteristic of the occupancy sensor and command and decode communication signals sent between the occupancy sensor and the remote device. At step 3200, information including the configuration or the operational information transmitted from the remote device is stored in non-volatile memory associated with the processor. At step 3300, the wireless transceiver transmits information from the occupancy sensor to the remote device to provide operational and/or configuration information relating to the sensor. At step 3400, an acknowledgement indication is provided to a user when the wireless transceiver receives a signal from the remote device. In some embodiments, the acknowledgement indication may include an audible or visual indication at least one of the occupancy sensor and the remote device.

Some of the inventive principles of the disclosure relate to techniques for occupancy sensing, in particular, for sensing the presence or motion of a person or a moving object in an area of interest. In one embodiment, lighting levels can be adjusted in or about the area of interest responsive to sensing the person or moving object. In another embodiment, a security alarm can be triggered responsive to sensing the person or moving object.

The disclosed system and method may provide enhanced safety for occupancy sensing systems used to monitor spaces for which public safety is implicated. Embodiments of the disclosed occupancy sensor can be used with conventional load control devices or enhanced load control devices to provide the desired fail safe illumination of such spaces.

Some embodiments of the disclosed device may be implemented, for example, using a storage medium, a computer-readable medium or an article of manufacture which may store an instruction or a set of instructions that, if executed by a machine (i.e., processor or microcontroller), may cause the machine to perform a method and/or operations in accordance with embodiments of the disclosure. By way of example, such a machine may include, but not limited to, any suitable processing platform, computing platform, computing device, processing device, computing system, processing system, computer, processor, or the like, and may be implemented using any suitable combination of hardware and/or software. The computer-readable medium or article may include, but not limited to, any suitable type of memory unit, memory device, memory article, memory medium, storage device, storage article, storage medium and/or storage unit, for example, memory (including, but not limited to, non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

What is claimed is:

1. An occupancy sensor, comprising:
   an occupancy sensing element;
   a wireless transceiver for receiving wireless signals from a remote device to configure the occupancy sensor from a remote location, the wireless transceiver capable of operating in a micro-Access Point (µAP) mode; and
   a processor in communication with the wireless transceiver, the processor for executing instructions to control at least one of a configuration and an operational characteristic of the occupancy sensor and for commanding and decoding communication signals sent between the occupancy sensor and the remote device;
   wherein said wireless transceiver is further configured to transmit wireless signals to the remote device, said transmitted wireless signals including information representative of an operational characteristic of said wireless occupancy sensor during a previous time period.

2. The occupancy sensor of claim 1, further comprising non-volatile memory associated with the processor for storing information including the configuration or the operational information transmitted from the remote device.

3. The occupancy sensor of claim 1, wherein the wireless transceiver is configured to transmit information to the remote device to provide configuration information relating to the occupancy sensor.

4. The occupancy sensor of claim 1, wherein the Wi-Fi transceiver is capable of serving web pages to connected clients when operating in said micro-Access Point (µAP) mode, and wherein the remote device is configured to call one of the web pages served by the micro-Access Point (µAP) mode, the web page including an interface for enabling a user to remotely configure the occupancy sensor.

5. The occupancy sensor of claim 1, wherein the micro-Access Point (µAP) mode enables router-less connection to the occupancy sensor by the remote device.

6. The occupancy sensor of claim 1, wherein the occupancy sensor is controllable via a custom application residing on the remote device.

7. The occupancy sensor of claim 1, wherein at least one of a sensor configuration and a sensor property is modifiable from a web page served by the Wi-Fi transceiver when operating in said micro-Access Point (µAP) mode.

8. The occupancy sensor of claim 7, wherein the at least one of a sensor configuration and a sensor property is selected from the list consisting of setting a delay time for an unoccupied mode, adjusting a sensor field of view, enabling/disabling a test mode, enabling/disabling an auto adapting functionality, enabling/disabling a forced on/forced off mode, setting the sensor in different modes, setting up a daylighting functionality, calibrating an associated photocell using an auto or manual calibration, enabling/disabling a walk through mode, enabling/disabling dimming using pre-set light levels, and adjusting sensor sensitivity.

9. The occupancy sensor of claim 1, wherein the Wi-Fi transceiver is capable of serving web pages to connected clients when operating in said micro-Access Point (µAP) mode, and wherein the served web pages enable a user to upgrade at least one of sensor and wireless transceiver firmware.

10. A method for controlling a load with a wireless occupancy sensor, comprising:
receiving, at a wireless occupancy sensor, wireless signals from a remote device, said received wireless signals configuring the occupancy sensor; and
transmitting, from said wireless occupancy sensor, wireless signals to the remote device, said transmitted wireless signals including information representative of an operational characteristic of said wireless occupancy sensor during a previous time period;
using a processor in communication with a wireless transceiver to control at least one of a configuration and an operational characteristic of the occupancy sensor and commanding and decoding communication signals sent between the occupancy sensor and the remote device, wherein the wireless transceiver comprises a Wi-Fi transceiver capable of operating in a micro-Access Point (µAP) mode for serving web pages to connected clients.

11. The method of claim 10, further comprising storing information including the at least one of the configuration and the operational characteristic information transmitted from the remote device in non-volatile memory associated with the processor.

12. The method of claim 10, further comprising transmitting information to the remote device to provide the at least one of the operational and the configuration characteristic information relating to the sensor.

13. The method of claim 10, wherein the remote device is at least one of a mobile device, a tablet device, and a desktop device having an Internet browser for connecting to the occupancy sensor using an IP address of the occupancy sensor.

14. The method of claim 10, further comprising calling one of the web pages, the one of the web pages including an interface for enabling a user to remotely configure the occupancy sensor.

15. The method of claim 10, wherein the micro-Access Point (µAP) mode enables router-less connection to the occupancy sensor by the remote device.

16. The method of claim 10, further comprising controlling the occupancy sensor via a custom application residing on the remote device.

17. The method of claim 10, further comprising modifying at least one of a sensor configuration and a sensor property from the served web pages.

18. The method of claim 17, wherein the at least one of a sensor configuration and a sensor property is selected from the list consisting of setting a delay time for an unoccupied mode, adjusting a sensor field of view, enabling/disabling a test mode, enabling/disabling an auto adapting functionality, enabling/disabling a forced on/forced off mode, setting the sensor in different modes, setting up a daylighting functionality, calibrating an associated photocell using an auto or manual calibration, enabling/disabling a walk through mode, enabling/disabling dimming using pre-set light levels, and adjusting sensor sensitivity.

19. The method of claim 10, further comprising upgrading at least one of sensor and Wi-Fi transceiver firmware via the served web pages.

20. An occupancy sensor, comprising:
a housing;
an occupancy sensing element for sensing and occupancy condition of a monitored area, the occupancy sensing element being located within the housing;
a wireless transceiver located within the housing, the wireless transceiver capable of operating in a micro-Access Point (µAP) mode for serving web pages to connected clients; and
a processor in communication with the wireless transceiver, the processor for executing instructions to control at least one of a configuration and an operational characteristic of the occupancy sensor and for commanding and decoding communication signals sent between the occupancy sensor and the remote device;
wherein the occupancy sensor is configured as a wireless access point to enable router-less connection between the occupancy sensor and a remote device.

21. The occupancy sensor of claim 20, wherein the occupancy sensor is controllable via a software program residing on the remote device.

22. The occupancy sensor of claim 21, wherein the software program is a custom application and the remote device is a mobile device.

23. The occupancy sensor of claim 20, wherein the occupancy sensor is controllable by the remote device via one of the served web pages, the one of the served web pages providing an interface tool to provide a platform independent configuration.

24. The occupancy sensor of claim 23, wherein the web page based interface tool is associated with a plurality of occupancy sensors, the plurality of occupancy sensors including said occupancy sensor, the web page based interface tool including a listing of said plurality of occupancy sensors, the web page based interface tool enabling a user to select said occupancy sensor from said plurality of occupancy sensors to thereby connect to said occupancy sensor.

25. The occupancy sensor of claim 20, wherein, in response to a wireless signal transmitted by the occupancy sensor, an identifier associated with the occupancy sensor is displayable on the remote device.

26. The occupancy sensor of claim 20, wherein the identifier is selectable at the remote device to connect the remote device with the occupancy sensor.

27. The occupancy sensor of claim 20, wherein the remote device is one of a laptop, personal computer, smartphone or tablet.

28. The occupancy sensor of claim 20, wherein, once connected, the occupancy sensor is configured to output one of a visual or audible indication in response to a signal transmitted by the remote device to enable a user to locate the connected occupancy sensor.

29. The occupancy sensor of claim 20, wherein the wireless transceiver is further configured to communicate with a wireless router to provide a router-based connection between the occupancy sensor and the remote device.

30. The occupancy sensor of claim 29, wherein the occupancy sensor is configured to enable a user to select between the router-less connection and the router-based connection.

31. The occupancy sensor of claim 20, wherein at least one of a sensor configuration and a sensor property is modifiable from the served web pages.

32. The occupancy sensor of claim 31, wherein the at least one of a sensor configuration and a sensor property is selected from the list consisting of setting a delay time for an unoccupied mode, adjusting a sensor field of view, enabling/disabling a test mode, enabling/disabling an auto adapting functionality, enabling/disabling a forced on/forced off mode, setting the sensor in different modes, setting up a daylighting functionality, calibrating an associated photocell using an auto or manual calibration, enabling/disabling a walk through mode, enabling/disabling dimming using pre-set light levels, and adjusting sensor sensitivity.

33. The occupancy sensor of claim 20, wherein the served web pages enable a user to upgrade at least one of sensor and wireless transceiver firmware.

34. The occupancy sensor of claim 20, wherein the wireless access point comprises a Wi-Fi hotspot.

35. A lighting control device for controlling an electrical load, comprising:
   an enclosure;
   a wireless transceiver located within the enclosure, the wireless transceiver comprising a Wi-Fi transceiver capable of operating in a micro-Access Point (µAP) mode; and
   a processor in communication with the wireless transceiver, the processor for executing instructions to control at least one of a configuration and an operational characteristic of the occupancy sensor and for commanding and decoding communication signals sent between the occupancy sensor and the remote device;
   wherein the device is configured as a wireless access point to enable router-less connection between the wireless transceiver and a remote device; and
   wherein the lighting control device is selected from one of an occupancy sensor, a photocell, and a power pack.

36. The lighting control device of claim 35, wherein the wireless access point comprises a Wi-Fi hotspot.

37. The lighting control device of claim 35, wherein the Wi-Fi transceiver is capable of serving web pages to connected clients when operating in said micro-Access Point (µAP) mode.

38. The lighting control device of claim 37, wherein at least one of a sensor configuration and a sensor property is modifiable from the served web pages.

39. The lighting control device of claim 38, wherein the at least one of a sensor configuration and a sensor property is selected from the list consisting of setting a delay time for an unoccupied mode, adjusting a sensor field of view, enabling/disabling a test mode, enabling/disabling an auto adapting functionality, enabling/disabling a forced on/forced off mode, setting the sensor in different modes, setting up a daylighting functionality, calibrating an associated photocell using an auto or manual calibration, enabling/disabling a walk through mode, enabling/disabling dimming using pre-set light levels, and adjusting sensor sensitivity.

40. The lighting control system of claim 37, wherein the served web pages enable a user to upgrade at least one of sensor and Wi-Fi transceiver firmware.

* * * * *

UNITED STATES PATENT AND TRADEMARK OFFICE
CERTIFICATE OF CORRECTION

PATENT NO.        : 9,271,375 B2
APPLICATION NO.   : 13/775534
DATED             : February 23, 2016
INVENTOR(S)       : Jaiganesh Balasubramanian et al.

Page 1 of 1

It is certified that error appears in the above-identified patent and that said Letters Patent is hereby corrected as shown below:

In Column 20, at (Line 48) in Claim 1 remove parenthetical (µAP).

In Column 21, at (Line 3 & 5) in Claim 4 remove parenthetical (µAP).

In Column 21, at (Line 9) in Claim 5 remove parenthetical (µAP).

In Column 21, at (Line 18) in Claim 7 remove parenthetical (µAP).

In Column 21, at (Line 33) in Claim 9 remove parenthetical (µAP).

In Column 21, at (Line 54) in Claim 10 remove parenthetical (µAP).

In Column 22, at (Line 6) in Claim 15 remove parenthetical (µAP).

In Column 22, at (Line 36) in Claim 20 remove parenthetical (µAP).

In Column 24, at (Line 3) in Claim 35 remove parenthetical (µAP).

In Column 24, at (Line 23) in Claim 37 remove parenthetical (µAP).

Signed and Sealed this
Fourth Day of September, 2018

Andrei Iancu
*Director of the United States Patent and Trademark Office*